(12) United States Patent
Tsukagoshi

(10) Patent No.: US 11,948,519 B2
(45) Date of Patent: Apr. 2, 2024

(54) IMAGE PROCESSING APPARATUS, IMAGE PROCESSING METHOD, TRANSMISSION APPARATUS, TRANSMISSION METHOD, AND RECEPTION APPARATUS

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 17/561,599

(22) Filed: Dec. 23, 2021

(65) Prior Publication Data

US 2022/0122551 A1    Apr. 21, 2022

Related U.S. Application Data

(63) Continuation of application No. 16/753,167, filed as application No. PCT/JP2018/037654 on Oct. 10, 2018, now Pat. No. 11,244,635.

(30) Foreign Application Priority Data

Oct. 12, 2017    (JP) .................. 2017-198908

(51) Int. Cl.
   *G09G 5/10*        (2006.01)
   *G09G 3/34*        (2006.01)
   *H04N 21/2362*     (2011.01)

(52) U.S. Cl.
   CPC ............. *G09G 3/3406* (2013.01); *G09G 5/10* (2013.01); *G09G 2320/0646* (2013.01); *G09G 2320/0666* (2013.01); *G09G 2360/16* (2013.01)

(58) Field of Classification Search
   CPC .................. G09G 3/3406; G09G 5/10; G09G 2320/0646; G09G 2320/0666;
   (Continued)

(56) References Cited

U.S. PATENT DOCUMENTS 10,924,184 B2    2/2021    Tsukagoshi
2003/0023910 A1*    1/2003    Myler .................. H04N 17/004
                                                   714/704
(Continued)

FOREIGN PATENT DOCUMENTS

CN    107148780    9/2017
JP    2011-33943 A    2/2011
(Continued)

OTHER PUBLICATIONS

International Search Report dated Nov. 20, 2018 in PCT/JP2018/037654 filed Oct. 10, 2018, 2 pages.
(Continued)

*Primary Examiner* — Antonio Xavier
(74) *Attorney, Agent, or Firm* — Richard LaPeruta

(57) ABSTRACT

Visual safety is ensured when image switching takes place. When an image is switched by nonlinear reproduction, a display property is kept switched, during a transition display period, to a transition display property with a brightness level kept lower than a normal level, on the basis of pixel statistical information regarding the image. For example, an electro-optic conversion property is controlled to a transition property or the brightness level of a backlight is suppressed.

20 Claims, 23 Drawing Sheets

(58) Field of Classification Search
CPC .. G09G 2360/16; H04N 9/68; H04N 21/8456; H04N 5/66; H04N 19/70; H04N 21/2362; H04N 21/431

See application file for complete search history.

(56) References Cited

U.S. PATENT DOCUMENTS

| | | | |
|---|---|---|---|
| 2007/0250876 A1* | 10/2007 | Odagawa | H04N 21/4667 725/89 |
| 2008/0239158 A1* | 10/2008 | Wu | H04N 5/202 348/E5.074 |
| 2009/0113484 A1* | 4/2009 | Sun | H04N 21/44016 725/38 |
| 2010/0214325 A1 | 8/2010 | Koyama et al. | |
| 2010/0309213 A1 | 12/2010 | Chen et al. | |
| 2011/0032268 A1 | 2/2011 | Takei | |
| 2012/0020413 A1* | 1/2012 | Chen | H04N 19/61 375/240.26 |
| 2012/0206570 A1* | 8/2012 | Tsukagoshi | H04N 13/111 348/51 |
| 2013/0128457 A1 | 5/2013 | Shioya et al. | |
| 2014/0078165 A1 | 3/2014 | Messmer et al. | |
| 2014/0232708 A1 | 8/2014 | Kitazawa | |
| 2015/0035868 A1 | 2/2015 | Lin | |
| 2015/0074129 A1* | 3/2015 | Friedrich | G06F 16/21 707/756 |
| 2015/0103919 A1 | 4/2015 | Hattori et al. | |
| 2015/0237356 A1* | 8/2015 | Wu | H04N 19/174 375/240.03 |
| 2015/0281707 A1 | 10/2015 | Messmer et al. | |
| 2015/0304665 A1* | 10/2015 | Hannuksela | H04N 19/70 375/240.02 |
| 2016/0080714 A1* | 3/2016 | Tsukagoshi | H04N 19/85 348/453 |
| 2016/0112715 A1 | 4/2016 | Hattori et al. | |
| 2016/0189619 A1 | 6/2016 | Park | |
| 2016/0212434 A1 | 7/2016 | Tsukagoshi | |
| 2016/0254028 A1 | 9/2016 | Atkins et al. | |
| 2016/0255360 A1 | 9/2016 | Hattori et al. | |
| 2017/0006273 A1 | 1/2017 | Borer | |
| 2017/0064242 A1 | 3/2017 | Tsukagoshi | |
| 2017/0125063 A1* | 5/2017 | Atkins | G11B 27/28 |
| 2017/0279530 A1 | 9/2017 | Tsukagoshi | |
| 2017/0372666 A1 | 12/2017 | Umeyama | |
| 2017/0374262 A1* | 12/2017 | Nagano | G09G 5/00 |
| 2017/0374313 A1 | 12/2017 | Oh et al. | |
| 2018/0048845 A1 | 2/2018 | Kozuka et al. | |
| 2018/0061368 A1 | 3/2018 | Sako | |
| 2018/0213265 A1 | 7/2018 | Toma et al. | |
| 2018/0262767 A1 | 9/2018 | Messmer et al. | |
| 2019/0110059 A1 | 4/2019 | Hattori et al. | |
| 2019/0289305 A1 | 9/2019 | Messmer et al. | |

FOREIGN PATENT DOCUMENTS

| | | |
|---|---|---|
| JP | 2011-180455 A | 9/2011 |
| JP | 2016-528826 A | 9/2016 |
| JP | 2016-213809 A | 12/2016 |
| JP | 2017-73760 A | 4/2017 |
| WO | WO 2009/044828 A1 | 4/2009 |
| WO | WO 2012/025986 A1 | 3/2012 |
| WO | WO 2016/129891 A1 | 8/2016 |

OTHER PUBLICATIONS

Series H: Audiovisual and Multimedia Systems, Infrastructure of audiovisual services—Coding of moving Video, High efficiency video coding, ITU-T H.265, Apr. 2013, 315 pages total.

Extended European Search Report dated Jun. 29, 2020 in European Patent Application No. 18867049.1, 12 pages.

"Dynamic Range Adjustment SEI to Enable High Dynamic Range Video Coding with Backward-Compatible Capability" Qualcomm Inc., ITU-T SG16 Meeting; Oct. 12, 2015-Oct. 23, 2015; Geneva, No. T13-SG16-C-1027, XP030100746, Sep. 29, 2015, pp. 1-11.

K. C. Noland, et al., "A Brightness Measure for High Dynamic Range Television" International Broadcasting Conference, 2017: Sep. 14, 2017-Sep. 18, 2017; Amsterdam, No. IBC-2017-35, XP030082682, Sep. 14, 2017, 8 pages.

\* cited by examiner

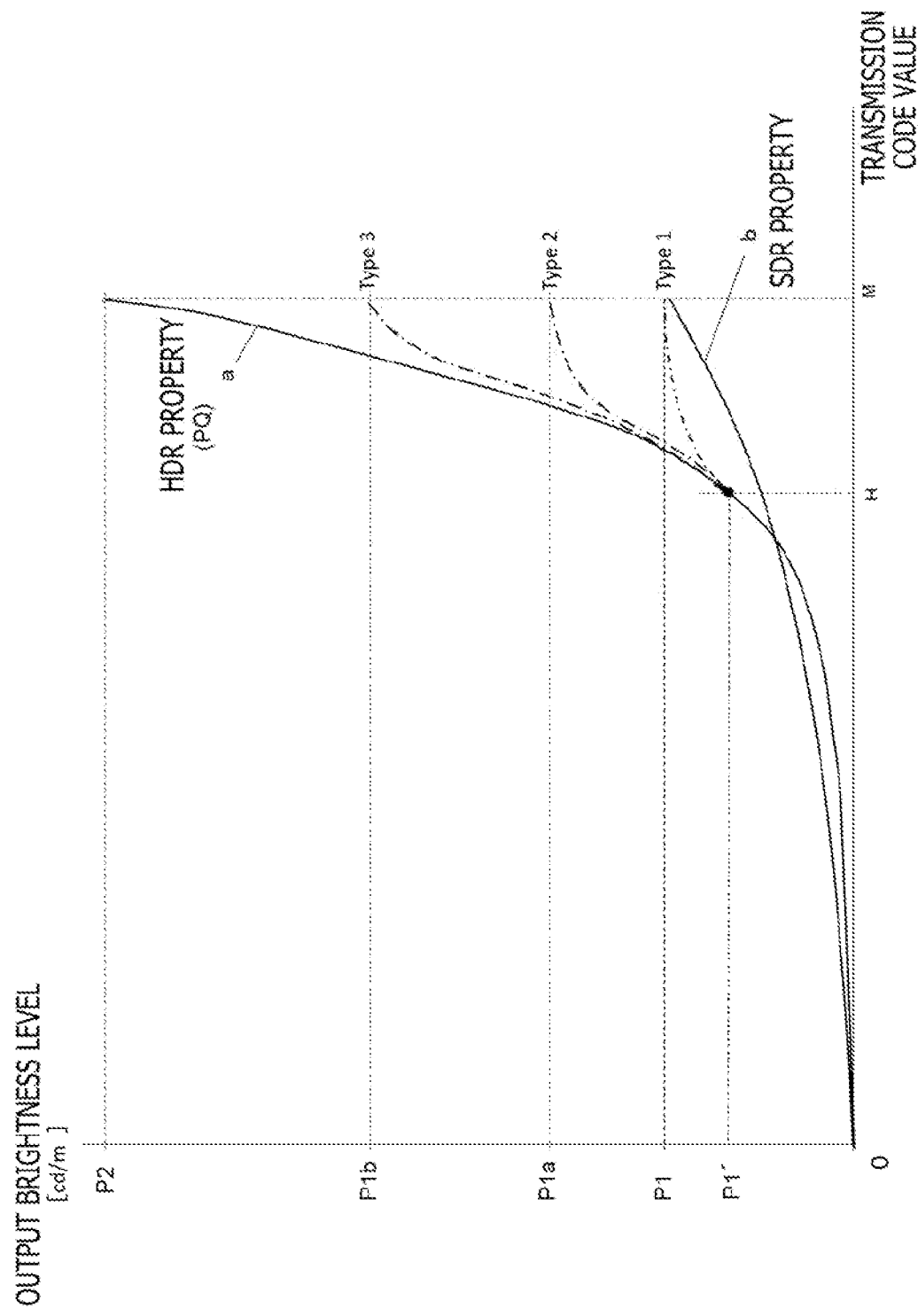
F I G. 4

"Statistical_Information SEI" Syntax (a)

| Syntax | No. of Bits | Format |
|---|---|---|
| Statistical_Information SEI (){ | | |
| EOTF Type | 4 | uimsbf |
| reserved | 4 | uimsbf |
| threshold_level | 16 | uimsbf |
| high_level_target_ratio | 8 | uimsbf |
| transition_period | 16 | uimsbf |
| } | | |
| } | | |

"Statistical Information SEI" Semantics (b)

| | |
|---|---|
| EOTF Type (4bits) | TYPE OF EOTF 0: reserved, 1: ITU-R BT.709(gamma), 2: ITU-R BT.2100 PQ, 3: ITU-R BT.2100 HLG |
| threshold_level (16bits) | LOWER LIMIT THRESHOLD FOR PIXEL LEVEL VALUE TARGETED FOR STATISTICAL INFORMATION |
| high_level_target_ratio (8bits) | RATIO OF TARGET PIXELS FOR TRANSITION PROPERTY TO ENTIRE IMAGE (VALUE * 100) |
| transition_period (16bits) | TRANSITION DISPLAY PERIOD (REPRESENTED IN FRAME COUNT VALUE) |

FIG. 13

"Transition Transfer Function SEI" Syntax

| Syntax | No. of Bits | Format |
|---|---|---|
| Transition Transfer Function ( ) { | | |
|   number_of_transition_types | 8 | uimsbf |
|   for ( k = 0; k < number_of_transition_types; k++) { | | |
|     transitionTF Type | 4 | uimsbf |
|     reserved | 4 | |
|     minimum_level | 16 | uimsbf |
|     maximum_level | 16 | uimsbf |
|     trace_pivot_size | 16 | uimsbf |
|     for ( j = 0 ; j < trace_pivot_size ; j++ ){ | | |
|       input_level(j) | 16 | uimsbf |
|       output_level(j) | 16 | uimsbf |
|     } | | |
|   } | | |
| } | | |

(a)

"Transition Transfer Function SEI" Semantics number_of_transition_types (8bits)   NUMBER OF TYPES OF TRANSITION PROPERTY
minimum_level (16bits)   MINIMUM INPUT PIXEL LEVEL OF CURVE AT WHICH TARGET EOTF IS CHANGED
maximum_level (16bits)   MAXIMUM INPUT PIXEL LEVEL OF CURVE AT WHICH TARGET EOTF IS CHANGED
trace_pivot_size (16bits)   NUMBER OF POINTS THROUGH WHICH TRANSITION PROPERTY IS TRACED
input_level(j) (16bits)   INPUT PIXEL LEVEL OF TRANSITION PROPERTY
output_level(j) (16bits)   OUTPUT VALUE FOR TRANSITION PROPERTY (b)

FIG.16
IMAGE OF PRECEDING PICTURE
(a) 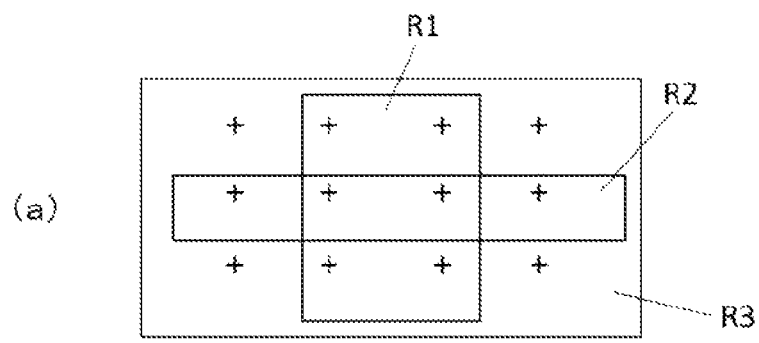
IMAGE OF CURRENT PICTURE
(b) 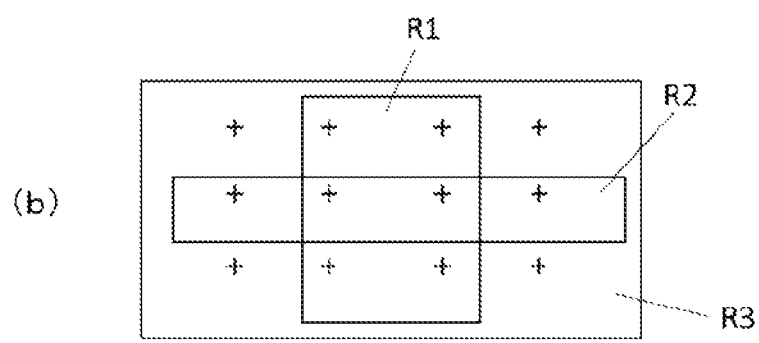

F I G. 2 1

HDMI Info Frame structure for transitional display control (a)

| Byte ¥ Bit # | 7 | 6 | 5 | 4 | 3 | 2 | 1 | 0 |
|---|---|---|---|---|---|---|---|---|
| Info Frame Type Code | New InfoFrame Type ||||||||
| Info Frame Version Number | Version = 0x01 ||||||||
| Length of transitional Display control | Length ||||||||
| Data Byte 1 | EOTF Type |||| reserved ||||
| Data Byte 2 | threshold_level (high byte) ||||||||
| Data Byte 3 | threshold_level (low byte) ||||||||
| Data Byte 4 | high_level_target_ratio ||||||||
| Data Byte 5 | transition_period (high byte) ||||||||
| Data Byte 6 | transition_period (low byte) ||||||||

(b)

| | |
|---|---|
| EOTF Type (4bits) | TYPE OF TRANSMISSION DISPLAY PROPERTY (Gamma, HLG, PQ) |
| threshold_pixel_level (16bits) | LOWER LIMIT THRESHOLD FOR PIXEL LEVEL VALUE TARGETED FOR STATISTICAL INFORMATION |
| high_level_target_ratio (8bits) | RATIO OF TARGET PIXELS FOR TRANSITION PROPERTY TO ENTIRE IMAGE (% *100) |
| transition_period (16bits) | TRANSITION DISPLAY PERIOD (REPRESENTED IN FRAME COUNT VALUE) |

FIG. 22

HDMI Info Frame structure for Transition Transfer Function (a)

| Byte # Bit # | 7 | 6 | 5 | 4 | 3 | 2 | 1 | 0 |
|---|---|---|---|---|---|---|---|---|
| Info Frame Type Code | New InfoFrame Type | | | | | | | |
| Info Frame Version Number | Version = 0x01 | | | | | | | |
| Length of transition transfer function | Length | | | | | | | |
| Data Byte 1 | number_of_transition_types | | | | | | | |
| Data Byte 2 | transition TF type | | | | reserved | | | |
| Data Byte 3 | minimum_level (high byte) | | | | | | | |
| Data Byte 4 | minimum_level (low byte) | | | | | | | |
| Data Byte 5 | maximum_level (high byte) | | | | | | | |
| Data Byte 6 | maximum_level (low byte) | | | | | | | |
| Data Byte 7 | trace_pivot_size(high byte) | | | | | | | |
| Data Byte 8 | trace_pivot_size(low byte) | | | | | | | |
| Data Byte 9 | input_level(j) (high byte) | | | | | | | |
| Data Byte 10 | input_level(j) (low byte) | | | | | | | |
| Data Byte 11 | output_level(j) (high byte) | | | | | | | |
| Data Byte 12 | output_level(j) (low byte) | | | | | | | |

(b)

number_of_transition_types(8bits) : NUMBER OF TYPES OF TRANSITION PROPERTY
transition TF type (4bits) : TYPE OF TRANSITION TRANSMISSION DISPLAY PROPERTY (TRTP) Type 1, Type 2, Type 3, ETC.
minimum_level (16bits) : MINIMUM INPUT PIXEL LEVEL OF CURVE AT WHICH TARGET EOTF IS CHANGED
maximum_level (16bits) : MAXIMUM INPUT PIXEL LEVEL OF CURVE AT WHICH TARGET EOTF IS CHANGED
trace_pivot_size (16bits) : NUMBER OF POINTS THROUGH WHICH TRANSITION PROPERTY IS TRACED
input_level(j) (16bits) : INPUT PIXEL LEVEL OF TRANSITION PROPERTY
output_level(j) (16bits) : OUTPUT VALUE FOR TRANSITION PROPERTY

IMAGE PROCESSING APPARATUS, IMAGE PROCESSING METHOD, TRANSMISSION APPARATUS, TRANSMISSION METHOD, AND RECEPTION APPARATUS

CROSS REFERENCE TO RELATED APPLICATIONS

This application is a continuation of U.S. application Ser. No. 16/753,167, filed on Apr. 2, 2020, and is based upon and claims the benefit of priority to International Application No. PCT/JP2018/037654, filed on Oct. 10, 2018 and JP 2017-198908, filed on Oct. 12, 2017. The entire contents of U.S. Ser. No. 16/753,167 are incorporated herein by reference.

TECHNICAL FIELD

The present technique relates to an image processing apparatus, an image processing method, a transmission apparatus, a transmission method, and a reception apparatus, and in particular to an image processing apparatus and the like that ensure visual safety when an image is switched.

BACKGROUND ART

For example, NPL 1 describes transmission of an HDR (High Dynamic Range) image at a level ranging from 0 to 100%*N (N is larger than 1).

CITATION LIST

Non-Patent Literature

[NPL 1]
High Efficiency Video Coding (HEVC) ITU-T H.265 standard

SUMMARY

Technical Problem

In HDR images, glitter components lead to high-brightness display during display. Linear reproduction already checked by a production side is assumed to be displayed without any problem. However, on a reception side, when image switching is performed by nonlinear reproduction as in channel switching, random access, system activation, or CM insertion, in a case where an image provided after the switching is very bright, visual safety may be threatened.

An object of the present technique is to ensure visual safety when image switching takes place.

Solution to Problem

A concept of the present technique lies in an image processing apparatus including:
a control section keeping, when an image is switched, a display property switched, during a transition display period, to a transition display property with a brightness level kept lower than a normal level, on the basis of pixel statistical information regarding the image.

In the present technique, when the image is switched, the display property is kept switched, during the transition display period, to the transition display property with the brightness level kept lower than the normal level, on the basis of the pixel statistical information regarding the image.

For example, the pixel statistical information may include information indicating a ratio, to the entire image, of pixels exceeding a threshold level. The ratio enables determination of whether or not the image is very bright.

For example, the control section may utilize the pixel statistical information obtained by processing image data. Additionally, for example, the control section may utilize information regarding the transition display period obtained on the basis of the pixel statistical information. Additionally, for example, the control section may utilize the pixel statistical information or the information regarding the transition display period extracted from encoded image data. In this case, a processing load can be reduced.

Additionally, for example, as the transition display property, a plurality of levels of transition display properties may be present, and the control section may sequentially apply the plurality of levels of transition display properties during the transition display period. In this case, the transition display property can be smoothly transitioned to a normal display property.

Additionally, for example, the control section may keep an electro-optic conversion property applied to image data, to a transition property during the transition display period. Additionally, for example, the control section may keep the brightness level of a backlight of a display device lower than the normal level during the transition display period.

Thus, in the present technique, when the image is switched, the display property is kept switched, during the transition display period, to the transition display property with the brightness level kept lower than the normal level, on the basis of the pixel statistical information regarding the image. Thus, visual safety can be ensured when image switching takes place.

Additionally, another concept of the present technique lies in a transmission apparatus including:
a transmission section transmitting a video stream obtained by encoding image data, and
an information insertion section inserting, into the video stream, pixel statistical information used to determine, when an image is switched, whether to keep a display property switched, during the transition display period, to a transition display property with a brightness level kept lower than a normal level.

In the present technique, the transmission section transmits the video stream obtained by encoding the image data. In this case, the information insertion section inserts, into the video stream, the pixel statistical information used to determine, when the image is switched, whether to keep the display property switched, during the transition display period, to the transition display property with the brightness level kept lower than the normal level. For example, the pixel statistical information may include information indicating a ratio, to the entire image, of pixels exceeding a threshold level.

Additionally, for example, the information insertion section may further insert information regarding the transition display period into the video stream. In this case, a reception side can save time and effort to calculate the transition display period. Additionally, for example, the information insertion section may insert, into the video stream, an electro-optic conversion transition property applied to the image data during the transition display period. This enables the reception side to switch to the electro-optic conversion transition property even in a case where the reception side is not provided with information regarding the electro-optic conversion transition property.

In this case, for example, the information regarding the electro-optic conversion transition property may include table information corresponding to a range of change in a normal electro-optic conversion property. This enables a reduction in the amount of information transmitted. Additionally, in this case, for example, as the transition property, a plurality of levels of transition properties may be present. This enables the reception side to smoothly transition from the transition property to the normal property.

Thus, in the present technique, the pixel statistical information is inserted into the video stream obtained by encoding the image data, and the resultant video stream is transmitted, the pixel statistical information being used to determine, when the image is switched, whether to keep the display property switched, during the transition display period, to the transition display property with the brightness level kept lower than the normal level. Accordingly, the reception side can save time and effort to calculate the pixel statistical information used to determine, when the image is switched, whether to keep the display property switched, during the transition display period, to the transition display property with the brightness level kept lower than the normal level.

Additionally, another concept of the present technique lies in a transmission apparatus including:

a digital interface section transmitting, along with image data, pixel statistical information used to determine, when an image is switched, whether to keep a display property switched, during a transition display period, to a transition display property with a brightness level kept lower than a normal level.

In the present technique, the digital interface section transmits, along with the image data, the pixel statistical information used to determine, when the image is switched, whether to keep the display property switched, during the transition display period, to the transition display property with the brightness level kept lower than the normal level.

For example, the digital interface section may further transmit information regarding an electro-optic conversion transition property applied to the image data during the transition display period. This enables the reception side to switch to the electro-optic conversion transition property even in a case where the reception side is not provided with information regarding the electro-optic conversion transition property. In this case, the information regarding the electro-optic conversion transition property may include table information corresponding to a range of change in a normal electro-optic conversion property. This enables a reduction in the amount of information transmitted.

Thus, in the present technique, the digital interface section transmits, along with the image data, the pixel statistical information used to determine, when the image is switched, whether to keep the display property switched, during the transition display period, to the transition display property with the brightness level kept lower than the normal level. Thus, the reception side can save time and effort to time and effort to calculate the pixel statistical information used to determine, when the image is switched, whether to keep the display property switched, during the transition display period, to the transition display property with the brightness level kept lower than the normal level.

Additionally, another concept of the lies in a reception apparatus including:

a digital interface section receiving, along with image data, pixel statistical information used to determine, when an image is switched, whether to keep a display property switched, during a transition display period, to a transition display property with a brightness level kept lower than a normal level.

In the present technique, the digital interface section receives, along with the image data, the pixel statistical information used to determine, when the image is switched, whether to keep the display property switched, during the transition display period, to the transition display property with the brightness level kept lower than the normal level. This enables saving of time and effort to calculate the pixel statistical information used to determine, when the image is switched, whether to keep the display property switched, during the transition display period, to the transition display property with the brightness level kept lower than the normal level.

Advantageous Effect of Invention

According to the present technique, visual safety can be ensured when the image is switched. Note that an effect described herein is not necessarily limited and that the effect described in the present disclosure may be exerted.

BRIEF DESCRIPTION OF DRAWINGS

FIG. 4 is a diagram illustrating an example of an HDR property (PQ) and the transition properties (TRTF) of Type 1, Type 2, and Type 3.

FIG. 12 is a diagram illustrating an example of a structure of a statistical information SEI message and contents of main information in the example of the structure.

FIG. 13 is a diagram illustrating an example of a structure of a transition transfer function SEI message and contents of main information in the example of the structure.

FIG. 16 is a diagram illustrating an example of control for a case where association with an image before switching is taken into account.

FIG. 21 is a diagram illustrating an example of a structure of a transitional display control HDMI info frame and contents of main information in the example of the structure.

FIG. 22 is a diagram illustrating an example of a structure of a transition transfer function HDMI info frame and contents of main information in the example of the structure.

DESCRIPTION OF EMBODIMENT

An embodiment of the present invention (hereinafter referred to as the "embodiment") will be described. Note that the description will be in the following order.
1. Embodiment
2. Modified Examples

1. EMBODIMENT

[Transmission and Reception System]

Figure 1:
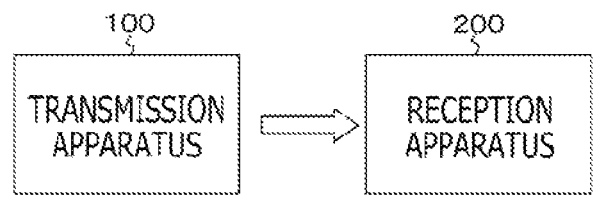
FIG. 1 is a block diagram illustrating an example of a configuration of a transmission and reception system as an embodiment.

FIG. 1 illustrates an example of a configuration of a transmission and reception system 10 as the embodiment. The transmission and reception system 10 includes a transmission apparatus 100 and a reception apparatus 200.

The transmission apparatus 100 transmits, through broadcasting or communication, a video stream obtained by encoding image data in compliance with H. 264/AVC, H. 265/HEVC, or the like. Into the video stream, pixel statistic information is inserted that is used to determine, when image switching takes place, whether to keep a display property switched, during a transition display period, to a transition display property with a brightness level kept lower than a normal level.

The pixel statistical information is, for example, information indicating the ratio, to the entire image, of pixels exceeding a threshold level. With the pixel statistical information inserted into the video stream, a reception side can save time and effort to calculate the pixel statistical information to determine, when image switching takes place, whether to keep the display property switched, during the transition display period, to the transition display property with the brightness level kept lower than the normal level.

Besides a function to check a brightness display capability of a display device (display) and convert a display level to the extent that the brightness can be displayed, the present embodiment includes a function to select an electro-optic conversion property for a transition period when image switching takes place at a receiver. The present embodiment thus performs switching to the transition display property with the brightness level kept lower than the normal level during the transition display period. In addition, with the pixel statistical information inserted into the video stream, the reproduction side can save time and effort to calculate the pixel statistical information to determine whether to switch to the display for the transition period.

Additionally, in addition to the pixel statistical information described above, information regarding the transition display period is inserted into the video stream. This enables the reception side to save time and effort to calculate the transition display period. Additionally, into the video stream, information regarding electro-optic conversion transition property is further inserted that is applied to predetermined moving image data during the transition display period. This enables the reception side to switch to the electro-optic conversion transition property even in a case where the reception side is provided with no information regarding the electro-optic conversion transition property. In this case, for example, the information regarding the electro-optic conversion transition property is table information corresponding to a range of change in a normal electro-optic conversion property. Thus, the amount of information transmitted can be reduced. Additionally, a single transition property may be used, but the present embodiment uses a plurality of levels of transition properties. This enables the reception side to smoothly transition from the transition property to a normal property.

In the embodiment, into the video stream, an SEI message is inserted that includes the above-described pixel statistical information, information regarding the transition display period, and the information regarding the electro-optic conversion transition property. The embodiment newly defines, for example, a Statistical Information SEI Message including the pixel statistical information and the information regarding the transition property, and a Transition Transfer Function SEI Message including the information regarding the electro-optic conversion transition property.

The reception apparatus 200 receives, through broadcasting or communication, a video stream obtained by encoding predetermined moving image data in compliance with H. 264/AVC, H. 265/HEVC, or the like. The reception apparatus 200 decodes the received video stream to obtain predetermined moving image data and obtains an image based on the predetermined moving image data. For example, the reception apparatus 200 can directly decode the received video stream to reproduce an image but can also reproduce an image by decoding the received video stream passed through a recording and reproduction section.

When an image is switched, the reception apparatus 200 keeps, on the basis of the pixel statistical information regarding the image, the display property switched, during the transition display period, to the transition display property with the brightness level kept lower than the normal level. For example, the pixel statistical information is, for example, information indicating the ratio, to the entire image, of pixels exceeding a threshold level. When the ratio is higher than the threshold, the display property is kept switched, during the transition display period, to the transition display property with the brightness level kept lower than the normal level. This enables visual safety to be ensured when image switching takes place.

In a case where the pixel statistical information or the information regarding the transition display period is inserted into encoded image data (video stream) of predetermined image data, the reception apparatus 200 can extract and use the information. This enables saving of time and effort to calculate the pixel statistical information or the transition display period. Additionally, the reception apparatus 200 can process predetermined moving image data to obtain and use the pixel statistical information or the information regarding the transition display period.

To change to the transition display property with the brightness level kept lower than the normal level, the reception apparatus 200 changes, to the transition property, the electro-optic conversion property applied to the predetermined moving image data, keeps the brightness level of a backlight of the display device lower than the normal level, or performs both of these operations. For example, a plurality of levels of transition display properties is utilized and sequentially applied during the transition display period. This enables smooth transition from the transition display property to the normal display property.

In a case where the information regarding the electro-optic conversion transition property is inserted into the encoded image data (video stream) of the predetermined image data, the reception apparatus 200 can extract and use the information. Thus, even in a case where the reception apparatus 200 is provided with no information regarding the electro-optic conversion transition property, the reception apparatus 200 can change, to the transition property, the electro-optic conversion property applied to the predetermined moving image data to obtain the transition display property with the brightness level kept lower than the normal level.

"Aspects of Image Switching"

Now, various aspects of the case in which the reception apparatus 200 performs image switching will be described.

(1) At Time of Channel Switching

Figure 2:
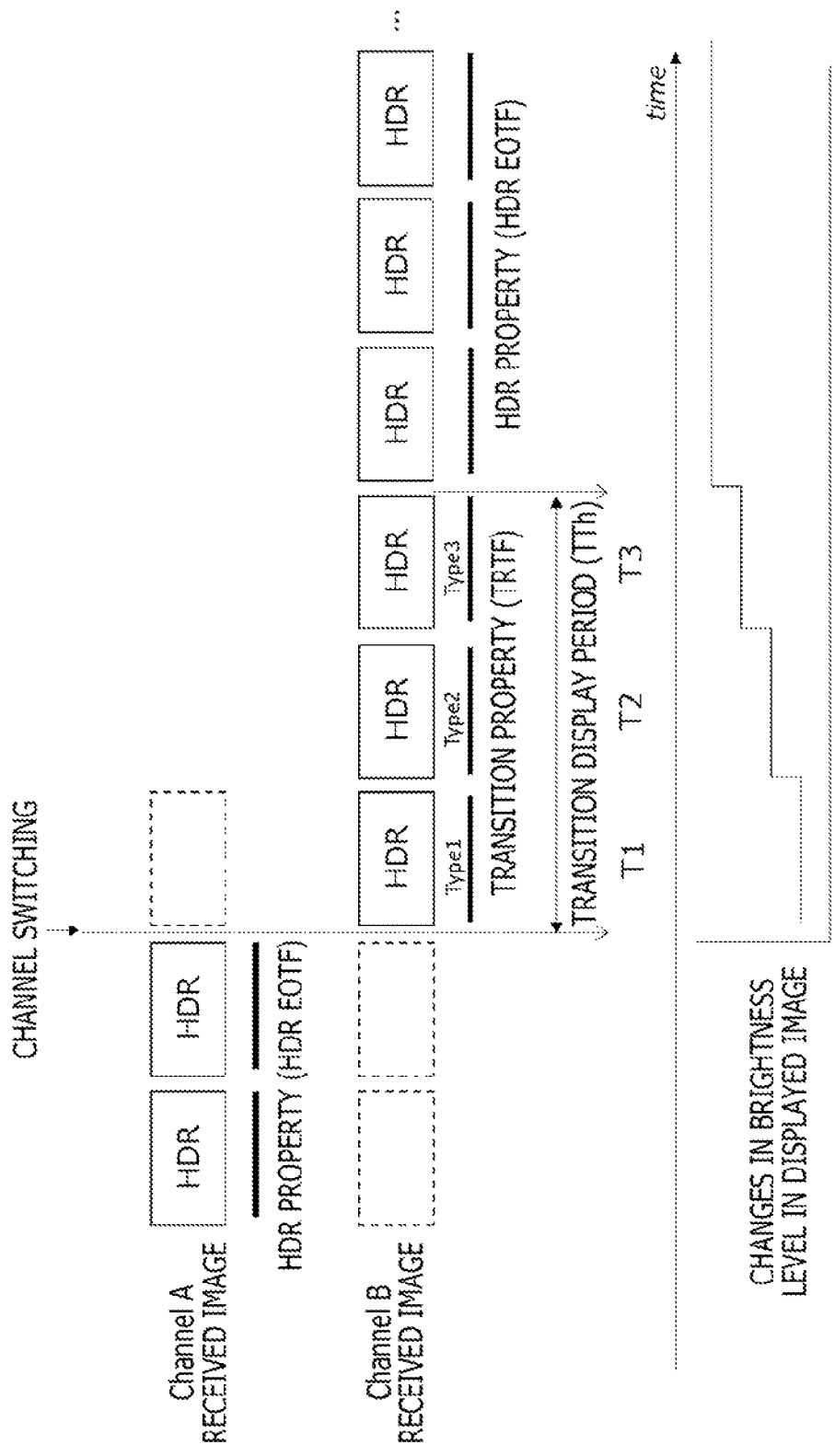
FIG. 2 is a diagram illustrating an example of control for a case in which an image on a channel A is switched to an image on a channel B by channel switching.

FIG. 2 illustrates an example of a case in which an image on a channel A is switched to an image on a channel B by channel switching. In the example, the image on the channel B obtained after the switching is to be controlled, and during the transition display period (TTh) after the switching, the electro-optic conversion property is changed to the transition property (TRTF) to keep the brightness level of a displayed image lower than the normal level. Additionally, after the transition display period (TTh) elapses, the electro-optic conversion property is changed to a normal HDR electro-optic conversion property (HDR EOTF) to relieve the brightness level of the image from being kept lower than the normal level.

In the example, control is provided such that the transition display period is divided into periods T1, T2, and T3 and that transition properties (TRTF) of Type 1, Type 2, and Type 3 are applied to the periods T1, T2, and T3, respectively, to sequentially increase the brightness level of the displayed image. Thus, the transition property is smoothly transitioned to the normal conversion property (HDR EOTF). Note that, in the illustrated example, a rectangular frame including characters "HDR" does not indicate a single picture (frame) but collectively indicate a single picture during each of the periods T1, T2, and T3 or a plurality of pictures (frames). This also applies to similar figures described below.

Figure 3:
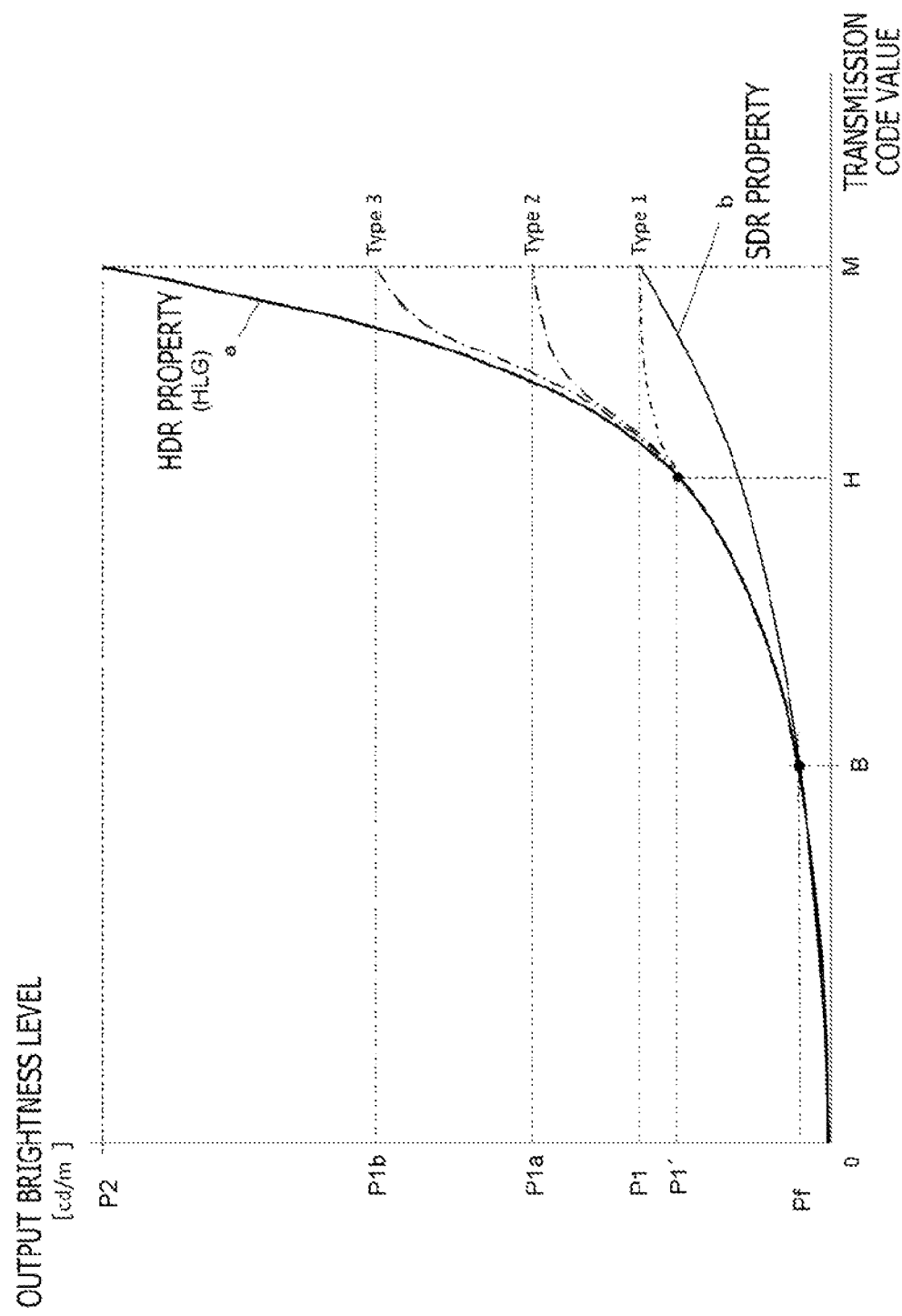
FIG. 3 is a diagram illustrating an example of an HDR property (HLG) and transition properties (TRTF) of Type 1, Type 2, and Type 3.

FIG. 3 illustrate an example of an HDR property (HLG) corresponding to the normal conversion property (HDR EOTF) in ITU-R BT. 2100 (HLG) and the transition properties (TRTF) of Type 1, Type 2, and Type 3.

The horizontal axis indicates a transmission code value, and the vertical axis indicates an output brightness level. A curve a indicates the HDR property (HLG), and a curve b indicates an SDR property. For the transmission code value ranging from 0 to a branch level B, the HDR property (HLG) has the same trajectory as that of the SDR property. Additionally, for the HDR property (HLG), an output brightness level P2 corresponds to the maximum level M of the transmission code value. For the SDR property, an output brightness level P1 corresponds to the maximum level M of the transmission code value.

For the transition properties (TRTF) of Type 1, Type 2, and Type 3, a range of change within which the property differs from the HDR property (HLG) corresponds to the range of the transmission code value from a threshold level H to the maximum level M. Here, an output brightness level P1' corresponds to the threshold level H. For the transition property of Type 1, the output brightness level P1 corresponds to the maximum level M on the transmission code value as is the case with the SDR property. Additionally, for the transition property of Type 2, an output brightness level P1a (P1<P1a<P2) corresponds to the maximum level M of the transmission code value. Additionally, for the transition property of Type 3, an output brightness level P1b (P1a<P1b<P2) corresponds to the maximum level M of the transmission code value.

FIG. 4 illustrates an example of an HDR property (PQ) corresponding to the normal conversion property (HDR EOTF) in ITU-R BT. 2100 (PQ) and the transition properties (TRTF) of Type 1, Type 2, and Type 3.

The horizontal axis indicates the transmission code value, and the vertical axis indicates the output brightness level. The curve a indicates the HDR property (PQ), and the curve b indicates an SDR property. For the HDR property (PQ), the output brightness level P2 corresponds to the maximum level M of the transmission code value. For the SDR property, the output brightness level P1 corresponds to the maximum level M of the transmission code value.

For the transition properties (TRTF) of Type 1, Type 2, and Type 3, a range of change within which the property differs from the HDR property (PQ) corresponds to the range of the transmission code value from a threshold level H to the maximum level M. Here, the output brightness level P1' corresponds to the threshold level H. For the transition property of Type 1, the output brightness level P1 corresponds to the maximum level M of the transmission code value as is the case with the SDR property. Additionally, for the transition property of Type 2, the output brightness level P1a (P1<P1a<P2) corresponds to the maximum level M of the transmission code value. Additionally, for the transition property of Type 3, the output brightness level P1b (P1a<P1b<P2) corresponds to the maximum level M of the transmission code value.

Note that one transition property, for example, the transition property of Type 1, may be applied to the entire transition display period (TTh).

(2) At Time of Channel Switching (via Black/Gray Image)

Figure 5:
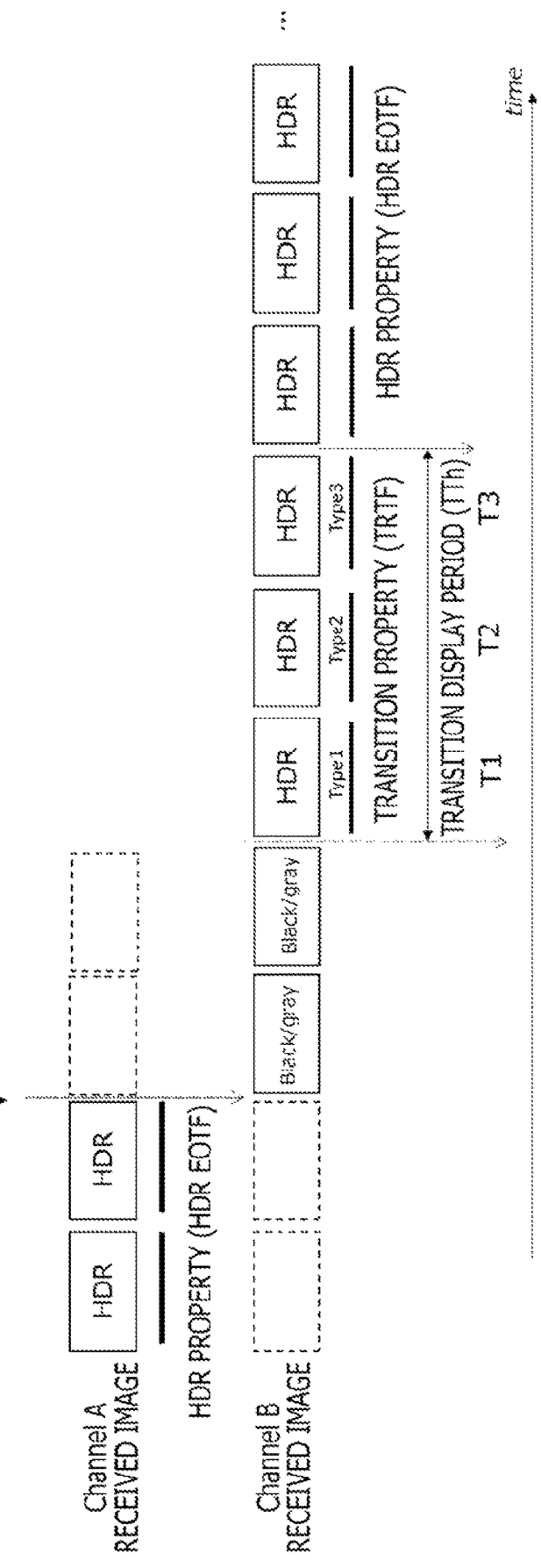
FIG. 5 is a diagram illustrating an example of control for a case in which an image on the channel A is switched to an image on the channel B by channel switching and in which a black or gray image is displayed during a certain period immediately after the switching.

FIG. 5 illustrates an example in which the image on the channel A is switched to the image on the channel B by channel switching and in which a black or gray image is displayed during a certain period immediately after the switching. Also in this example, the image on the channel B obtained after the switching is to be controlled, and during the transition display period (TTh) after the display of the black or gray image, the electro-optic conversion property is changed to the transition property (TRTF) to keep the brightness level of the displayed image lower than the normal level. Additionally, after the transition display period (TTh) elapses, the electro-optic conversion property is changed to the normal HDR electro-optic conversion property (HDR EOTF) to relieve the brightness level of the displayed image from being kept lower than the normal level.

In the example, control is provided such that the transition display period is divided into the periods T1, T2, and T3 and that the transition properties of Type 1, Type 2, and Type 3 are applied to the periods T1, T2, and T3, respectively (see FIG. 3 and FIG. 4) to sequentially increase the brightness level of the displayed image. Thus, the transition property is smoothly transitioned to the normal conversion property (HDR EOTF). Note that one transition property, for example, the transition property of Type 1, may be applied to the entire transition display period (TTh).

(3) At Time of System Activation and Random Access

Figure 6:
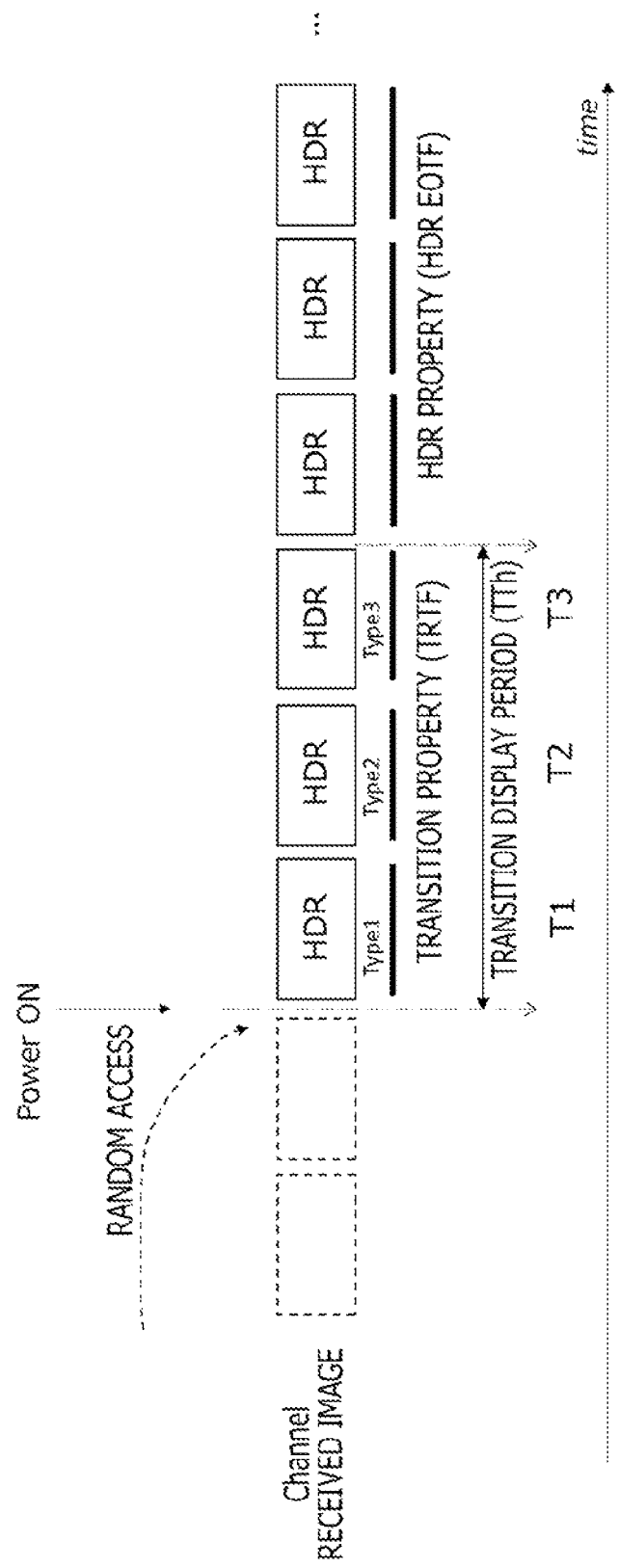
FIG. 6 is a diagram illustrating an example of control for a case in which image switching is performed by system activation (power-on) or random access.

FIG. 6 illustrates an example of a case in which image switching is performed by system activation (power on) or random access. In the example, an image provided after the system activation or random access is to be controlled, and during the transition display period (TTh) after the switching, the electro-optic conversion property is changed to the transition property (TRTF) to keep the brightness level of the displayed image lower than the normal level. Additionally, after the transition display period (TTh) elapses, the electro-optic conversion property is changed to the normal HDR electro-optic conversion property (HDR EOTF) to relieve the brightness level of the displayed image from being kept lower than the normal level.

In the example, control is provided such that the transition display period is divided into the periods T1, T2, and T3 and that the transition properties of Type 1, Type 2, and Type 3 are applied to the periods T1, T2, and T3, respectively (see FIG. 3 and FIG. 4) to sequentially increase the brightness level of the displayed image. Thus, the transition property is smoothly transitioned to the normal conversion property (HDR EOTF). Note that one transition property, for example, the transition property of Type 1, may be applied to the entire transition display period (TTh).

(4) At Time of System Activation and Random Access (via Black/Gray Image)

Figure 7:
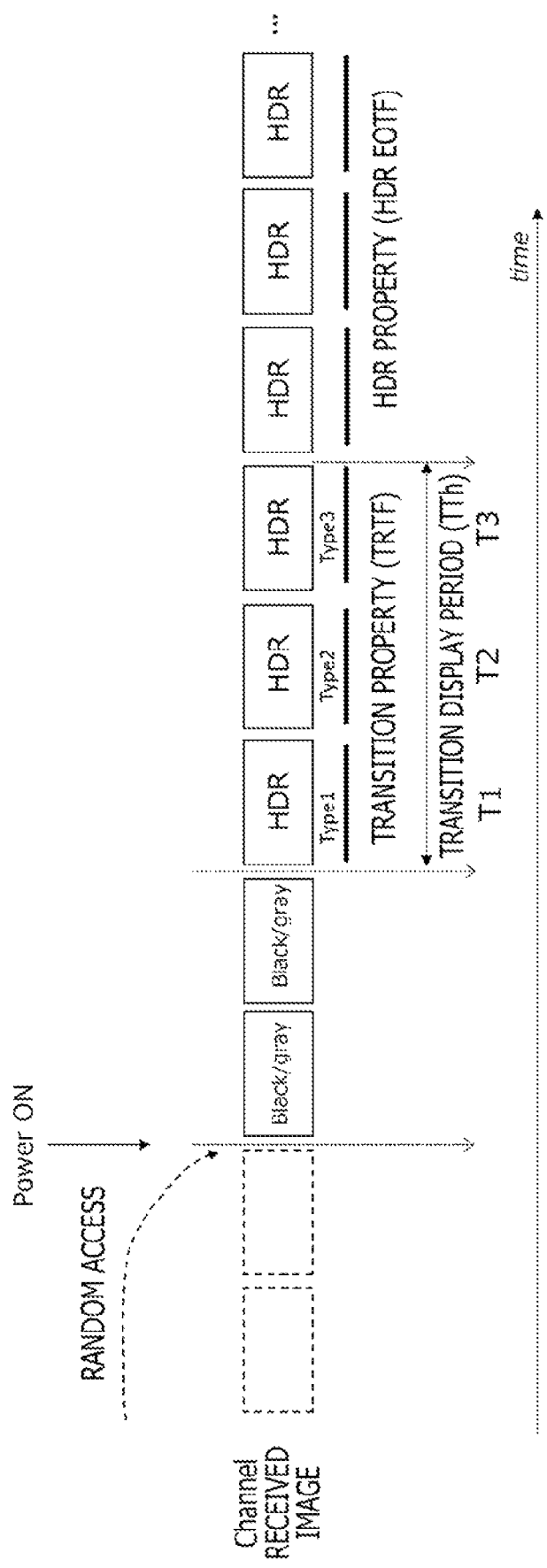
FIG. 7 is a diagram illustrating an example of control for a case in which image switching is performed by system activation (power on) or random access and in which a black or gray image is displayed during a certain period immediately after the switching.

FIG. 7 illustrates an example in which image switching is performed by system activation (power on) or random access and in which a black or gray image is displayed during a certain period immediately after the switching. Also in this example, an image provided after the system activation (power on) or random access is to be controlled, and during the transition display period (TTh) after the display of the black or gray image, the electro-optic conversion property is changed to the transition property (TRTF) to keep the brightness level of the displayed image lower than the normal level. Additionally, after the transition display period (TTh) elapses, the electro-optic conversion property is changed to the normal HDR electro-optic conversion property (HDR EOTF) to relieve the brightness level of the displayed image from being kept lower than the normal level.

In the example, control is provided such that the transition display period is divided into the periods T1, T2, and T3 and that the transition properties of Type 1, Type 2, and Type 3 are applied to the periods T1, T2, and T3, respectively (see FIG. 3 and FIG. 4) to sequentially increase the brightness level of the displayed image. Thus, the transition property is smoothly transitioned to the normal conversion property (HDR EOTF). Note that one transition property, for example, the transition property of Type 1, may be applied to the entire transition display period (TTh).

(5) At Time of CM/Program Switching

Figure 8:
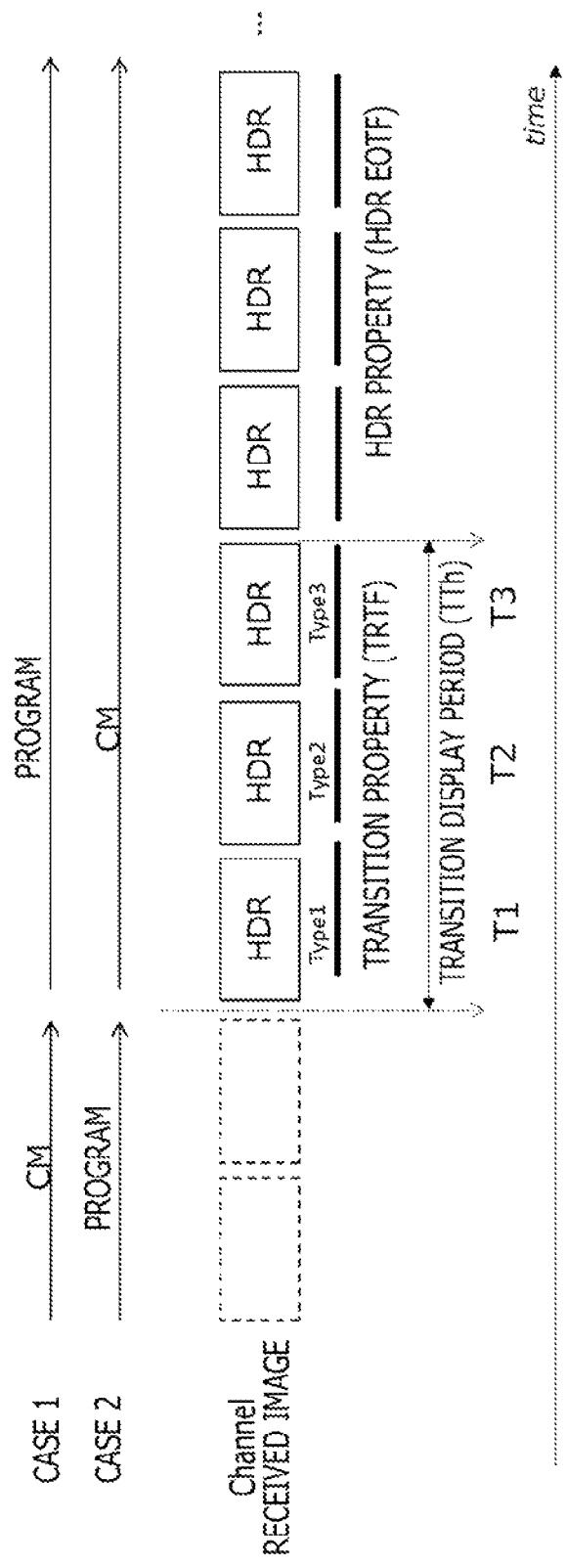
FIG. 8 is a diagram illustrating an example of control for a case in which image switching is performed by switching between a CM and a program.

FIG. 8 illustrates an example of a case in which image switching takes place at the time of switching between a CM and a program. The CM in this case is assumed to be, for example, optionally inserted by the reception side. In the example, an image provided after switching from the CM to the program or from the program to the CM is to be controlled, and during the transition display period (TTh) after the switching, the electro-optic conversion property is changed to the transition property (TRTF) to keep the brightness level of the displayed image lower than the normal level. Additionally, after the transition display period (TTh) elapses, the electro-optic conversion property is changed to the normal HDR electro-optic conversion property (HDR EOTF) to relieve the brightness level of the displayed image from being kept lower than the normal level.

In the example, control is provided such that the transition display period is divided into the periods T1, T2, and T3 and that the transition properties of Type 1, Type 2, and Type 3 are applied to the periods T1, T2, and T3, respectively (see FIG. 3 and FIG. 4) to sequentially increase the brightness level of the displayed image. Thus, the transition property is smoothly transitioned to the normal conversion property (HDR EOTF). Note that one transition property, for example, the transition property of Type 1, may be applied to the entire transition display period (TTh).

"Configuration of Transmission Apparatus"

Figure 9:
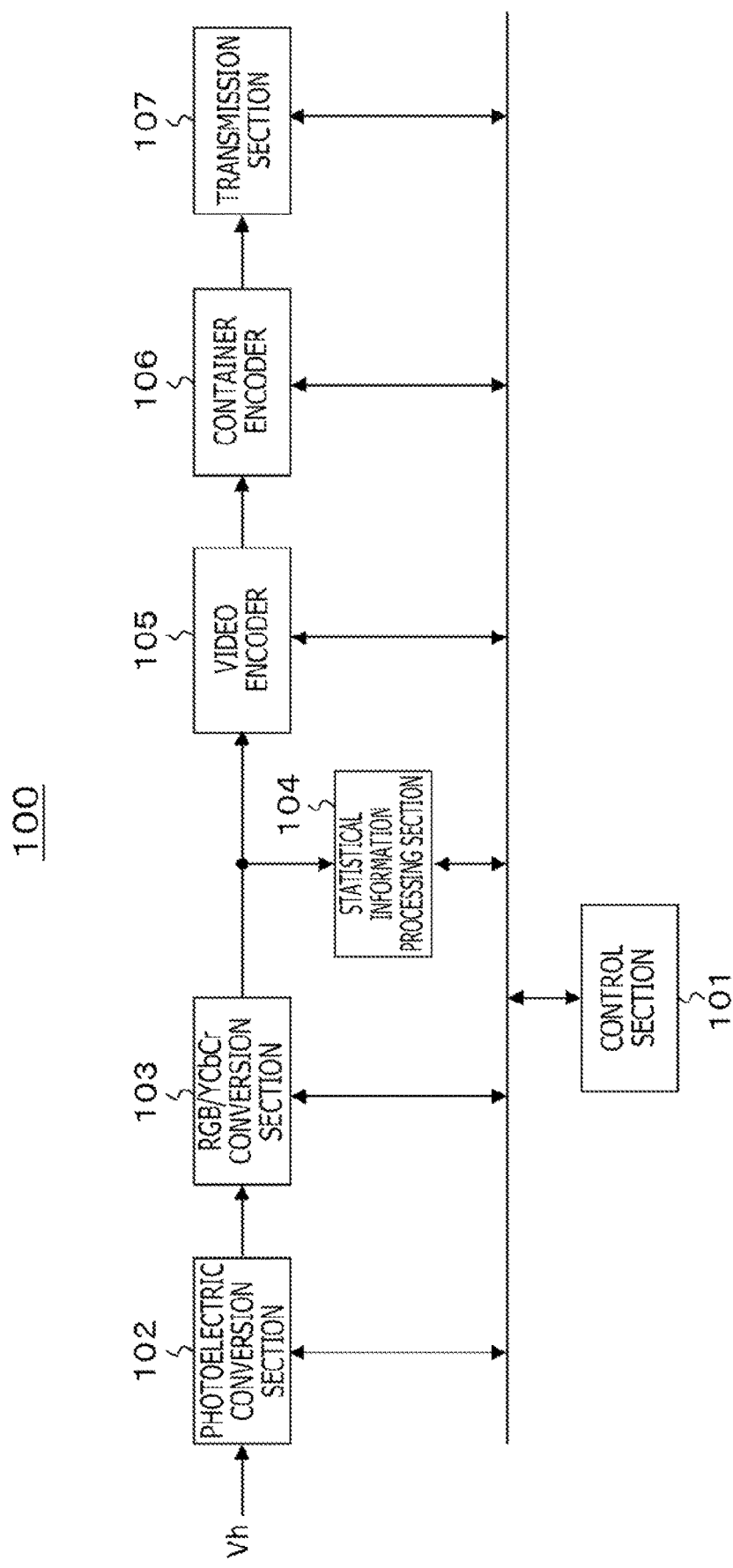
FIG. 9 is a block diagram illustrating an example of a configuration of a transmission apparatus.

FIG. 9 illustrates an example of a configuration of the transmission apparatus 100. The transmission apparatus 100 includes a control section 101, a photoelectric conversion section 102, an RGB/YCbCr conversion section 103, a statistical information processing section 104, a video encoder 105, a container encoder 106, and a transmission section 107. The control section 101 includes a CPU (Central Processing Unit) to control operation of each section of the transmission apparatus 100.

The photoelectric conversion section 102 performs a photoelectric conversion by applying an HDR photoelectric conversion property (HLG curve or PQ curve) to, for example, a high-contrast camera output as moving image data, that is, HDR (High Dynamic Range) image data Vh. The RGB/YCbCr conversion section 103 converts image data obtained after the photoelectric conversion, from an RGB domain into a YCbCr domain. In this case, the RGB/YCbCr conversion section 103 performs the conversion on the basis of color space information using a conversion formula corresponding to a color space.

The statistical information processing section 104 processes the image data obtained by the RGB/YCbCr conversion section 103 to calculate pixel statistical information. In this case, the statistical information processing section 104 calculates, for each picture (frame), the ratio α, to the entire image, of pixels each with a pixel level exceeding a threshold level (TH_high).

Figure 10:
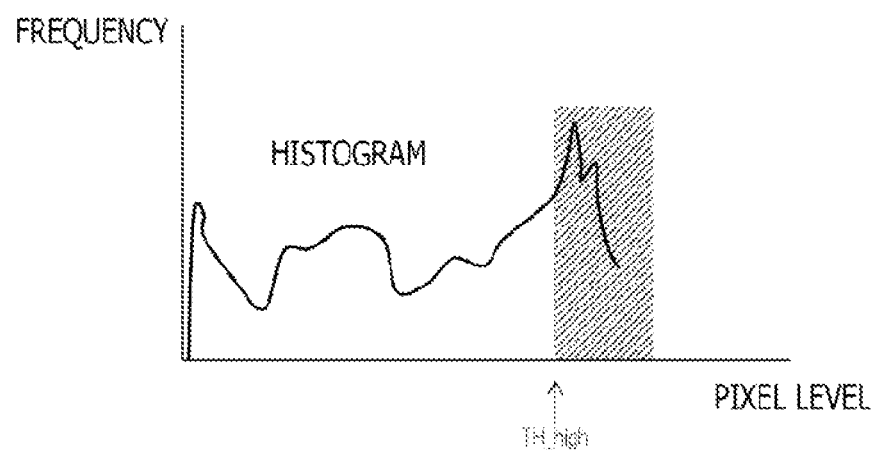
FIG. 10 is a diagram illustrating an example of a histogram of the entire image.
Figure 11:
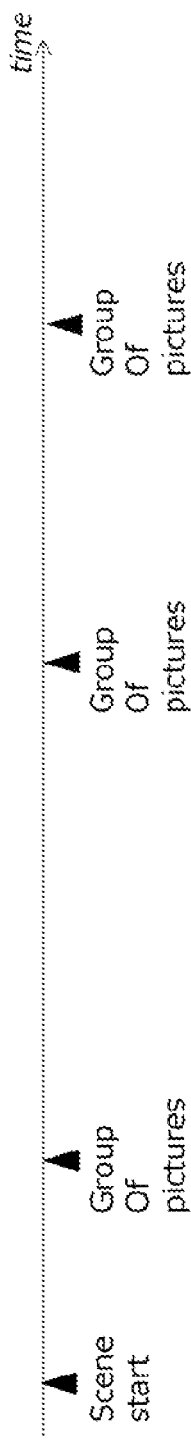
FIG. 11 is a diagram illustrating positions where a transition transfer function SEI message is inserted.

FIG. 10 illustrates an example of a histogram of the entire image. In the histogram, the vertical axis indicates frequency, and the horizontal axis indicates a pixel level as a class. The ratio α is calculated by dividing, by the sum of the frequencies for all pixel levels, the sum (hatched portion) of the frequencies for pixel levels exceeding the threshold level (TH_high).

The statistical information processing section 104 calculates the ratio α of the pixels with the pixel level exceeding the threshold level (TH_high), on the basis of Equation (1). In Equation (1), a denominator of a fractional expression on the right side represents the number of pixels in the entire image, and a numerator represents the number of pixels each with a brightness level exceeding the threshold level (TH_high).

[Math. 1]

$$a = \frac{\Sigma \, pixel(TH\_high)}{\Sigma \, pixel(whole \, picture)} \quad (1)$$

Additionally, the statistical information processing section 104 calculates information regarding the transition display period TTh transmitted by the transmission apparatus 100 along with information regarding the ratio α. In this case, first, Equation (2) is used to multiply the ratio α by a predetermined coefficient Tc to determine a transition display period TTr. The statistical information processing section 104 then converts TTr to a video frame rate equivalent to obtain the transition display period TTh expressed in frame count value.

[Math. 2]

$$TTr = \frac{\Sigma \, pixel(TH\_high)}{\Sigma \, pixel(whole \, picture)} * Tc \quad (2)$$

The statistical information processing section 104 transmits, to the control section 101, information regarding the ratio α and the transition display period TTh. The video encoder 105 applies encoding, for example, MPEG4-AVC or HEVC, to image data obtained by the RGB/YCbCr conversion section 103 to obtain encoded video data and obtains a video stream (video elementary stream) including the encoded video data.

At this time, the video encoder 105 inserts, into a VUI (video usability information) region of an SPS NAL unit of an access unit (AU), meta information indicating that the video stream is an HDR stream and further indicating the electro-optic conversion property and the like. Additionally, the video encoder 105 inserts, into an "SEIs" portion of the access unit (AU), the above-described statistical information SEI message and transition transfer function SEI message.

Note that statistical information SEI message, including the pixel statistical information or the information regarding the transition display period, is inserted into the access unit of each picture but that the transition transfer function SEI message, including the information regarding the electro-optic conversion transition property, need not necessarily be inserted into the access unit of each picture and is inserted into, for example, the start of a scene and the access unit of a picture corresponding to a GOP (Group of Pictures).

Additionally, the information regarding the electro-optic conversion transition property can be inserted into a layer in a container described below. For example, for MPEG-2 TS or MMT, the information regarding the electro-optic conversion transition property is inserted into a descriptor. For MP4 (ISO BMFF), the information regarding the electro-optic conversion transition property is inserted into a box in a moof. For broadcasting based on DASH, the information regarding the electro-optic conversion transition property is inserted into MPD by a "supplemental property descriptor."

The statistical information SEI message includes the pixel statistical information or the information regarding the transition display period as described above. FIG. 12(a) illustrates an example of a structure (Syntax) of the statistical information SEI message. FIG. 12(b) illustrates the contents (Semantics) of main information in the example of the structure.

A 4-bit field "EOTF Type" indicates the type of the EOTF. For example, "1" denotes "ITU-R Rec. BT.709(gamma)," "2" denotes "ITU-R Rec. BT.2100 PQ," and "3" denotes "ITU-R Rec. BT.2100 HLG."

A 16-bit field "threshold_level" indicates a lower limit threshold for pixel level values targeted for statistical information, in other words, the threshold level (TH_high). An 8-bit field "high_level_target_ratio" indicates the value of the ratio α, to the entire image, of the pixels targeted for the transition property. The ratio is multiplied by 100 to obtain a percent value. A 16-bit field "transition_period" indicates the transition display period TTh expressed in frame count value.

Additionally, the transition transfer function SEI message includes the information regarding the electro-optic conversion transition property as described above. FIG. 13(a) illustrates an example of a structure (Syntax) of the transition transfer function SEI message. FIG. 13(b) illustrates the contents (Semantics) of main information in the example of the structure.

An 8-bit field "number_of_transition_types" indicates the number of types of the transition property. The information regarding the transition property is repeatedly present such that the number of repetitions is equal to the number of types of the transition property.

A 4-bit field "transitionTF Type" indicates the type of the transition property. For example, "1" denotes Type 1, "2" denotes Type 2, and "3" denotes Type 3 (see FIG. 3 and FIG. 4). A 16-bit field "minimum_level" indicates the minimum input pixel level of a curve at which the target EOTF is changed (see the threshold level H of the transmission code value in FIG. 3 and FIG. 4). A 16-bit field "maximum_level" indicates the maximum input pixel level of a curve at which the target EOTF is changed (see the maximum level M of the transmission code value in FIG. 3 and FIG. 4).

A 16-bit field "trace_pivot_size" indicates the number of points through which the transition property is traced. A 16-bit field "input_level(j)" and a 16-bit field "output_level (j)" are repeatedly present such that the number of repetitions is equal to the number of the points through which the transition property is traced. The field "input_level(j)" indicates the input pixel level of the transition property. The field "output_level(j)" indicates an output value for the transition property corresponding to the input level.

Referring back to FIG. 9, the container encoder 106 generates, as a broadcasting stream, a container including the video stream generated by the video encoder 105, for example, MPEG-2 TS, MMT, MP4 (ISOBMFF). At this time, the information regarding the electro-optic conversion transition property, which is similar to that included in the above-described transition transfer function SEI message, may be inserted into a layer in the container. The transmission section 107 transmits the broadcasting stream obtained by the container encoder 106, to the reception apparatus 200 through broadcasting or communication.

Operation of the transmission apparatus 100 illustrated in FIG. 9 will be described in brief. For example, HDR image data Vh used as a high-contrast camera output is supplied to the photoelectric conversion section 102. The photoelectric conversion section 103 applies a photoelectric conversion to the HDR image data Vh using the HDR photoelectric conversion property, obtaining image data as a video material produced by HDR OETF.

The HDR image data obtained by the photoelectric conversion section 102 is supplied to the RGB/YCbCr conversion section 103. The RGB/YCbCr conversion section 103 converts the image data obtained by the photoelectric conversion section 102, from the RGB domain into the YCbCr domain. The image data converted into the YCbCr domain is supplied to the statistical information processing section 104 and the video encoder 105.

The statistical information processing section 104 processes the image data obtained by the RGB/YCbCr conversion section 103 to calculate the pixel statistical information. In the embodiment, the ratio α, to the entire image, of the pixels each with a pixel level exceeding the threshold level (TH_high) is calculated for each picture (frame) (see Equation (1)).

Additionally, the statistical information processing section 104 calculates the information regarding the transition display period TTh transmitted by the transmission apparatus 100 along with the information regarding the ratio α. In this case, the ratio α is multiplied by the predetermined coefficient Tc to determine the transition display period TTr in units of time (see Equation (2)), which is subsequently converted into a video frame rate equivalent to obtain the transition display period TTh expressed in frame count value. The information regarding the ratio α and the information regarding the transition display period TTh calculated by the statistical information processing section 104 are transmitted to the control section 101.

The video encoder 105 applies encoding, for example, MPEG4-AVC or HEVC, to the image data obtained by the RGB/YCbCr conversion section 103 to obtain encoded video data, and generates a video stream (video elementary stream) including the encoded video data.

At this time, the video encoder 105 inserts, into the VUI (video usability information) region of the SPS NAL unit of the access unit (AU), the meta information indicating that the video stream is an HDR stream and further indicating the HDR electro-optic conversion property and the like. Additionally, the video encoder 105 inserts, into the "SEIs" portion of the access unit (AU), the statistical information SEI message including the information regarding the ratio α and the information regarding the transition display period TTh described above (see FIG. 12(a)), and further inserts, into the "SEIs" portion of the access unit (AU), the transition transfer function SEI message including the information regarding the electro-optic conversion transition property (see FIG. 13(a)).

The video stream obtained by the video encoder 105 is supplied to the container encoder 106. The container encoder 106 generates, as a broadcasting stream, a container including the video stream, for example, MPEG-2 TS, MMT, MP4 (ISOBMFF). The broadcasting stream is transmitted to the reception apparatus 200 through broadcasting or communication by the transmission section 107.

"Example of Configuration of Reception Apparatus"

Figure 14:
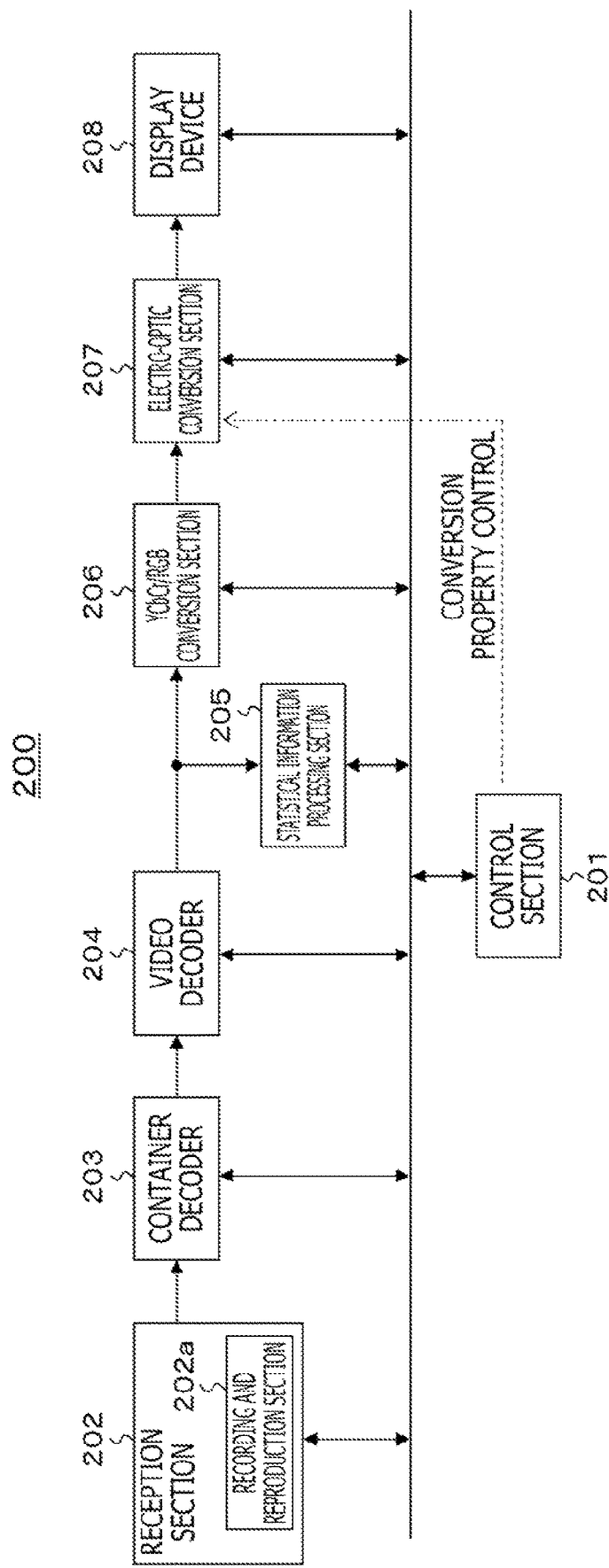
FIG. 14 is a block diagram illustrating an example of a configuration of a reception apparatus.

FIG. 14 illustrates an example of a configuration of the reception apparatus 200. The reception apparatus 200 includes a control section 201, a reception section 202, a container decoder 203, a video decoder 204, a statistical information processing section 205, and a YCbCr/RGB conversion section 206, an electro-optic conversion section 207, and a display device 208.

The control section 201 includes a CPU (Central Processing Unit) to control operation of each section of the reception apparatus 200 on the basis of a control program. The reception apparatus 200 receives the broadcasting stream from the transmission apparatus 100 through broadcasting or communication. The reception apparatus 200 includes a recording and reproduction section 202a and outputs the received broadcasting stream (MPEG-2 TS, MMT, MP4 (ISOBMFF), or the like) directly or via the recording and reproduction section 202a. In a case where the broadcasting stream is output via the recording and reproduction section 202a, random access is enabled. Additionally, the reception section 202 includes a channel switching function.

The container decoder 203 extracts the video stream from the broadcasting stream (MPEG-2 TS, MMT, MP4 (ISOBMFF), or the like) output from the reception section 202.

The video decoder 204 executes decoding processing on the video stream extracted by the container decoder 203 to obtain HDR image data. Additionally, the video decoder 204 extracts a parameter set or the SEI message inserted into each access unit included in the video stream and transmits the parameter set or SEI message to the control section 201. In a case where, in the transmission apparatus 100, the statistical information SEI message (see FIG. 12(a)) or the transition transfer function SEI message (see FIG. 13(a)) is inserted into the video stream as described above, the SEI massage is also transmitted to the control section 201.

On the basis of the meta information in the VUI region of the SPS NAL unit, the control section 201 recognizes that the video stream is an HDR stream and also recognizes the HDR electro-optic conversion property information or the like. Additionally, the control section 201 checks a brightness display capability of the display device (display) on the display device side and selects the electro-optic conversion property for the transition period to the extent that the brightness can be displayed. At this time, the control section 201 acquires, from the above-described statistical information SEI message, the pixel statistical information (information regarding the ratio α, to the entire image, of the pixels each with a pixel level exceeding the threshold level (TH_high)) and the information regarding the transition display period TTh. Additionally, the control section 201 acquires the information regarding the electro-optic conversion transition property from the above-described transition transfer function SEI message.

When failing to acquire, from the above-described statistical information SEI message, the pixel statistical information (information regarding the ratio α, to the entire image, of the pixels each with a pixel level exceeding the threshold level (TH_high)) and the information regarding the transition display period TTh, the statistical information processing section 205 processes the image data obtained by the video decoder 204 to calculate the information similarly to the statistical information processing section 104 in the transmission apparatus 100 in FIG. 9. The statistical information processing section 205 transmits, to the control section 201, the calculated information regarding the ratio α and information regarding the transition display period TTh.

The YCbCr/RGB conversion section 206 converts the image data obtained by the video decoder 204, from the YCbCr (brightness and color difference) domain into the RGB domain. The electro-optic conversion section 207 applies the electro-optic conversion property to the image data converted into the RGB domain by the YCbCr/RGB conversion section 206, to obtain display image data. The display device 208 is, for example, a liquid crystal display (LCD) and displays an image based on the display image data.

Under the control of the control section 201, the electro-optic conversion section 207 normally applies the normal HDR electro-optic conversion property (HDR EOTF), but in a case where image switching is performed by nonlinear reproduction, as in channel switching, system activation, random access, and CM/program switching, applies the transition property (TRTF) during the transition display period (TTh) after the switching to keep the brightness level of the displayed image lower than the normal level (see FIG. 2 and FIGS. 5 to 8).

In this case, as the transition property, one or more transition properties are used. As the information regarding the transition property, relevant information preliminarily provided in the reception apparatus 200 is utilized, and in a case where no such information is provided, the information regarding the electro-optic conversion transition property is utilized that is acquired from the transition transfer function SEI message as described above.

With a plurality of transition properties present, the electro-optic conversion section 207 divides the transition display period into a plurality of periods (the periods need not be equal) and sequentially applies the plurality of levels of transition properties, under the control of the control section 201. This allows the transition property to be smoothly transitioned to the HDR electro-optic conversion property (HDR EOTF). The example in FIG. 2 and FIGS. 5 to 8 described above indicates a case where the three transition properties are prepared.

Figure 15:
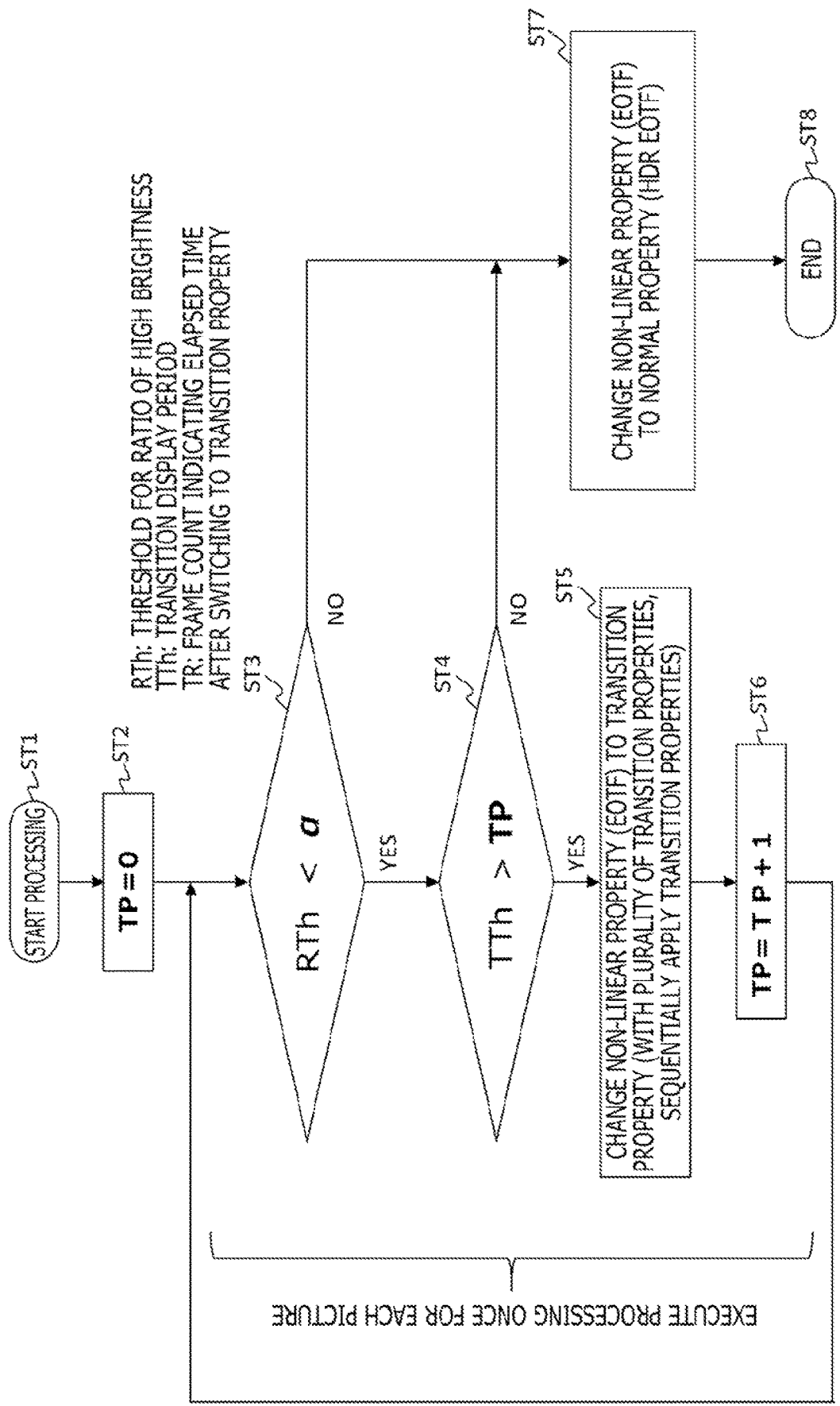
FIG. 15 is a flowchart illustrating an example of a procedure for controlling a photoelectric conversion section performed by a control section in a case where image switching is performed by non-linear reproduction.

A flowchart in FIG. 15 illustrates an example of a procedure executed by the control section 201 for controlling the electro-optic conversion section 207 in a case where image switching is performed by nonlinear reproduction. The nonlinear control section 201 starts processing in step ST1. Then, in step ST2, the control section 201 resets, to 0, a frame count TP indicating the elapsed time after switching to the transition property, and shifts to processing in step ST3 for processing of the first picture (frame) after the image switching.

In step ST3, the control section 201 determines whether or not the ratio $\alpha$ is higher than a threshold RTh for the ratio of high brightness to the entire image, the ratio $\alpha$ being acquired from the statistical information SEI message or calculated by the statistical information processing section 205 as described above, in other words, the ratio $\alpha$ being the ratio, to the entire image, of the pixels each with a pixel level exceeding the threshold level (TH_high). Here, the threshold RTh is preset by the reception apparatus 200.

In a case where the ratio $\alpha$ is determined to be higher than the threshold RTh, the control section 201 proceeds to processing in step ST4. In step ST4, whether or not the transition display period TTh is larger than the frame count TP is determined, the transition display period TTh being acquired from the statistical information SEI message or calculated by the statistical information processing section 205 as described above. Note that the ratio $\alpha$ used in step ST3 is assumed to be obtained for each picture (frame) but that the transition display period TTh used in step ST4 is fixed to the transition display period TTh obtained for the first picture (frame) after the image switching.

In a case where the transition display period TTh is determined to be larger than the frame count TP, the control section 201 sets, as the transition property, the electro-optic conversion property applied to the current picture (frame) by the electro-optic conversion section 207. In step ST5, with a plurality of transition properties present, the plurality of levels of transition properties is sequentially applied to the respective periods into which the transition display period TTh is divided.

After the processing in step ST5, the control section 201 increases the frame count TP in step ST6, and then returns to step ST3 to execute control processing similar to the above-described control processing for processing of the next picture (frame).

Additionally, in a case where, in step ST3, the ratio $\alpha$ is determined not to be higher than the threshold RTh, or in step ST4, the transition display period TTh is determined not to be larger than the frame count TP, the control section 201 shifts to processing in step ST7. In step ST7, the control section 201 changes, to the normal HDR electro-optic conversion property, the electro-optic conversion property applied to the current and subsequent pictures (frames) by the electro-optic conversion section 207, and ends the processing in step ST8.

Operation of the reception apparatus 200 illustrated in FIG. 14 will be described in brief. The reception section 202 receives the broadcasting stream (MPEG-2 TS, MMT, MP4 (ISOBMFF), or the like) from the transmission apparatus 100 through broadcasting or communication, and outputs the broadcasting stream directly or via the recording and reproduction section 202a.

The broadcasting stream output from the reception apparatus 200 is supplied to the container decoder 203. The container decoder 203 extracts the video stream from the broadcasting stream. Additionally, the container decoder 203 extracts various types of information included in the layer in the container and transmits the information to the control section 201. In a case where the layer in the container includes the information regarding the electro-optic conversion transition property, this information is also extracted and transmitted to the control section 201.

The video stream extracted by the container decoder 203 is supplied to the video decoder 204. The video decoder 204 applies decoding processing to the video stream to obtain HDR image data.

Additionally, the video decoder 204 extracts the parameter set or the SEI message inserted into each access unit included in the video stream, and transmits the parameter set or the SEI message to the control section 201. As the thus extracted SEI message, the video stream includes the statistical information SEI message (see FIG. 12(a)) or the transition transfer function SEI message (see FIG. 13(a)).

The HDR image data obtained by the video decoder 204 is supplied to the statistical information processing section 205 and the YCbCr/RGB conversion section 206. In a case of failing to acquire, from the statistical information SEI message, the pixel statistical information (information regarding the ratio $\alpha$, to the entire image, of the pixels each with a pixel level exceeding the threshold level (TH_high)) and the information regarding the transition display period TTh, the statistical information processing section 205 processes the image data to calculate those pieces of information and transmits the information to the control section 201.

The YCbCr/RGB conversion section 206 converts the HDR image data obtained by the video decoder 204, from the YCbCr/RGB (brightness and color difference) domain into the RGB domain. After being converted into the RGB domain, the image data is supplied to the electro-optic conversion section 207. The electro-optic conversion section 207 applies the electro-optic conversion property to the image data to obtain display image data. Then, the display device 208 displays an image based on the display image data.

Under the control of the control section 201, the electro-optic conversion section 207 normally applies the normal HDR electro-optic conversion property (HDR EOTF), but in a case where image switching is performed by nonlinear reproduction, as in channel switching, system activation, random access, and CM/program switching, applies the transition property (TRTF) during the transition display period (TTh) after the switching to keep the brightness level of the displayed image lower than the normal level (see FIG. 2 and FIGS. 5 to 8).

Note that the above description of the reception apparatus 200 illustrates the example in which no consideration is made for (association with the unswitched image in control of the conversion property performed by the electro-optic conversion section 207 in a case where the image is switched by nonlinear reproduction as in channel switching, system activation, random access, or CM/program switching.

An example of control performed in a case where the association with the unswitched image is taken into consideration will be described. FIG. 16(a) illustrates a preceding picture image (unswitched image), and FIG. 16(b) illustrates a switched, current picture image. For example, the statistical information processing section 205 sets common regions R1, R2, and R3 for the respective images and calculates the ratio α (see Equation (1) described above) of the pixels each with a pixel level exceeding the threshold level (TH_high) in each region of the preceding and current picture images.

Then, the control section 201 determines whether a ratio difference between the ratio α of the preceding picture and the ratio α of the current picture in each region is within a range Gc. On the basis of the determination result, the control section 201 controls the conversion property to be applied by the electro-optic conversion section 207.

Figure 17:
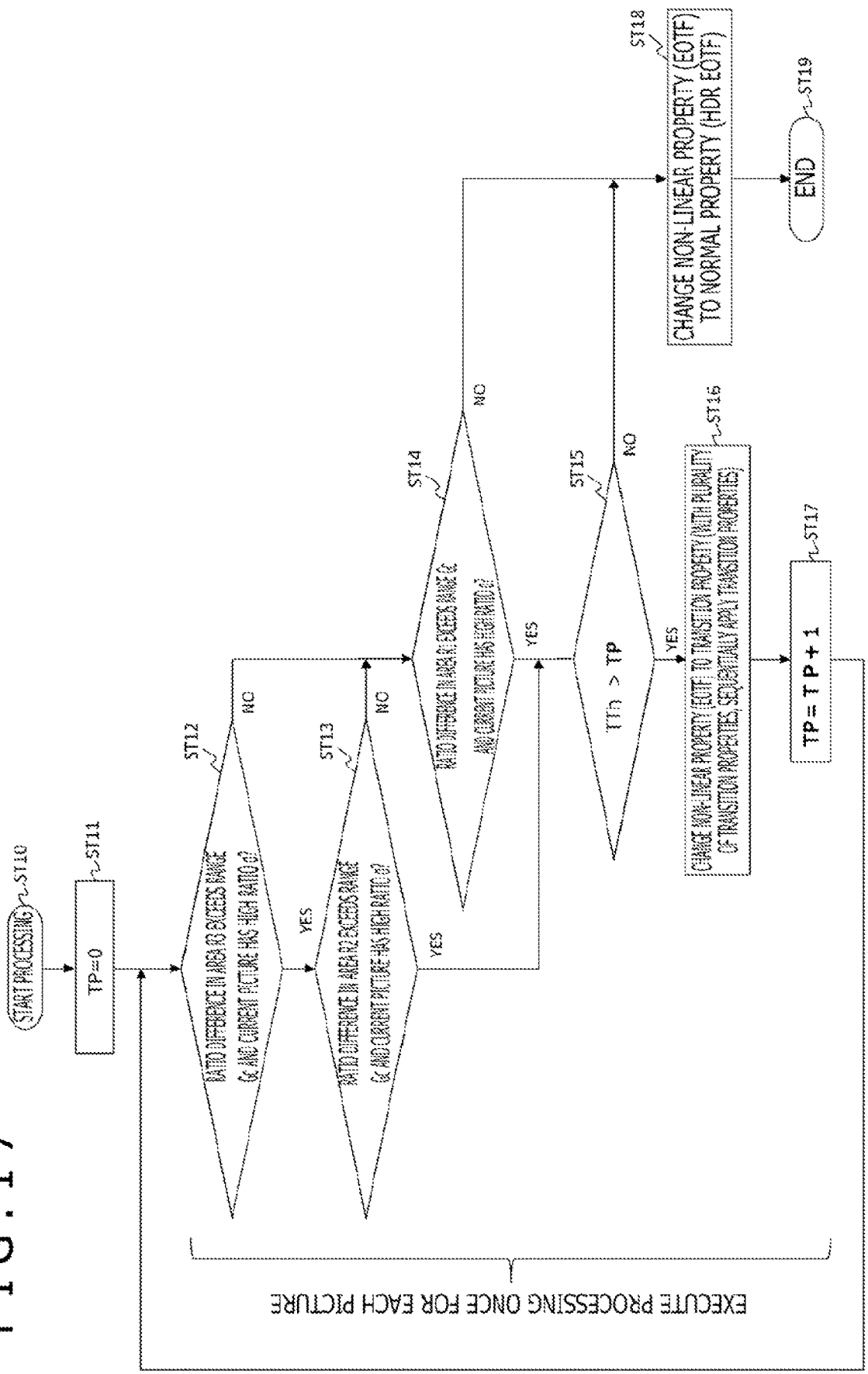
FIG. 17 is a flowchart illustrating an example of a procedure for controlling the photoelectric conversion section performed by the control section in a case where image switching is performed by non-linear reproduction.

A flowchart in FIG. 17 illustrates another example of a procedure executed by the control section 201 for controlling the electro-optic conversion section 203 in a case where image switching is performed by nonlinear reproduction. The nonlinear control section 201 starts processing in step ST10. Then, in step ST11, the control section 201 resets, to 0, the frame count TP indicating the elapsed time after switching to the transition property, and shifts to processing in step ST12 for processing of the first picture (frame) after the image switching.

In step ST 12, the control section 201 makes an affirmative or a negative determination for the condition that the ratio difference in the region R3 exceeds the range Gc and that the current picture has a high ratio α. In a case of an affirmative determination, the control section 201 makes, in step ST13, an affirmative or a negative determination for the condition that the ratio difference in the region R2 exceeds the range Gc and that the current picture has a high ratio α. In a case of an affirmative determination, the control section 201 proceeds to processing in step ST15.

In a case of a negative determination in step ST12 or in step ST13, the control section 201 makes, in step ST14, an affirmative or a negative determination for the condition that the ratio difference in the region R1 exceeds the range Gc and that the current picture has a high ratio α. In a case of an affirmative determination, the control section 201 proceeds to processing in step S15.

In step ST15, the control section 201 determines whether or not the transition display period TTh is larger than the frame count TP. Note that the ratio α used in step ST12, step ST13, and step ST14 is assumed to be obtained for the respective pictures (frames) but that the transition display period TTh is fixed to the transition display period obtained for the first picture (frame) after the image switching.

In a case of determining the transition display period TTh to be larger than the frame count TP, in step ST16, the control section 201 changes, to the transition property, the electro-optic conversion property applied to the current picture (frame) by the electro-optic conversion section 207. In step ST16, with a plurality of transition properties present, the plurality of levels of transition properties is sequentially applied to the respective periods into which the transition display period TTh is divided.

After the processing in step ST16, the control section 201 increases the frame count TP in step ST17, and then returns to step ST12 to execute control processing similar to the above-described control processing for processing of the next picture (frame).

Additionally, in a case of a negative determination in step ST14 or in a case where, in step ST16, the transition display period TTh is determined not to be larger than the frame count TP, the control section 201 shifts to processing in step ST18. In step ST18, the control section 201 changes, to the normal HDR conversion property, the electro-optic conversion property applied to the current and subsequent pictures (frames) by the electro-optic conversion section 207. In step ST19, the control section 201 ends the processing.

Note that the reception apparatus 200 in FIG. 14 described above changes, to the transition property, the electro-optic conversion property applied by the electro-optic conversion section 207 to change the display property during the transition display period to the transition display property with the brightness level kept lower than the normal level. However, a similar transition display property may be achieved by controlling the LED backlight of the display device 208.

Figure 18:
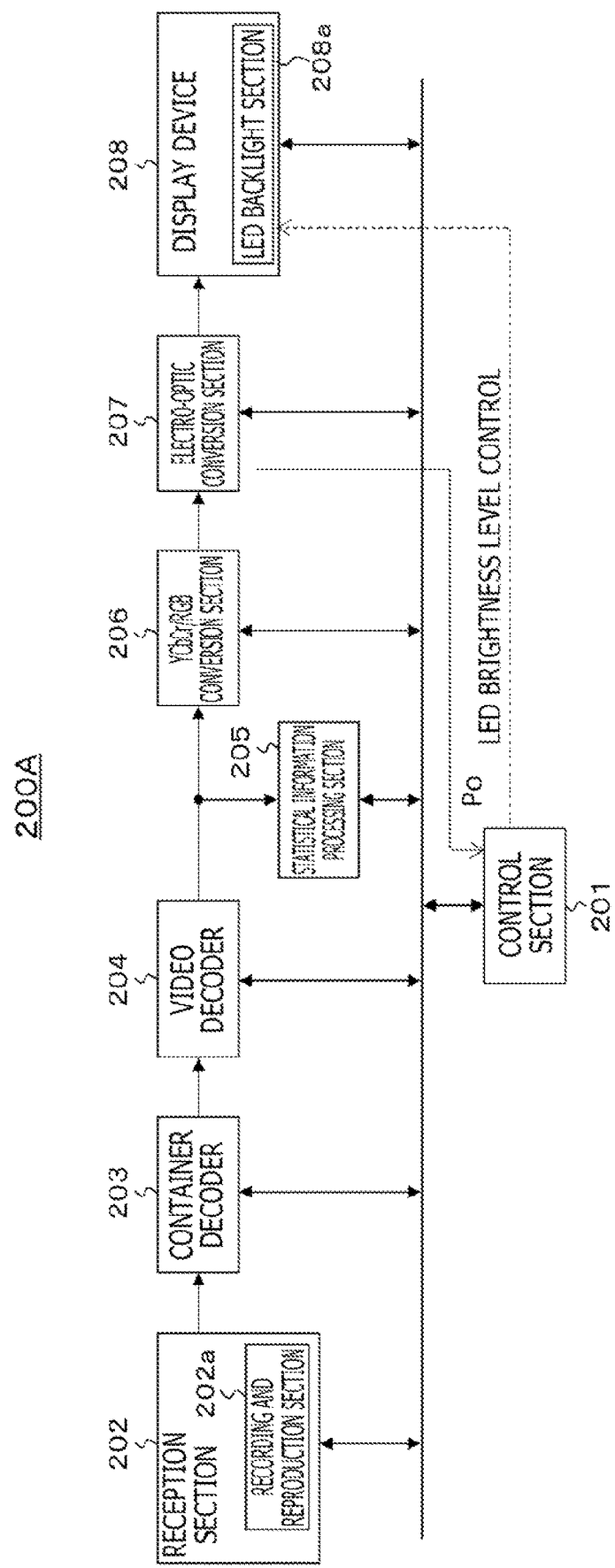
FIG. 18 is a block diagram illustrating an example of a configuration of a reception apparatus achieving a transition display property by backlight control.

FIG. 18 illustrates an example of a configuration of the reception apparatus 200A achieving the transition display property through backlight control. Components in FIG. 18 for which corresponding components are illustrated in FIG. 14 are denoted by the same reference numerals, and detailed description of the components are omitted.

In the reception apparatus 200A, the electro-optic conversion section 207 obtains position information Po regarding the pixels each having a pixel level exceeding the threshold level (TH_high) and targeted for the transition property, and transmits the position information Po to the control section 201. The control section 201 controls a LED backlight section 208a of the display device 208 to reduce a light emission level of LEDs corresponding to pixels at positions indicated by the position information Po such that the display property during the transition display period is changed to the transition display property with the brightness level kept lower than the normal level.

Control of the control section 201 in this case is provided by, for example, replacing the control for changing the electro-optic conversion to the transition property in step ST5 in the flowchart in FIG. 15 described above with control for reducing the light emission level of the LEDs corresponding to the pixels at the positions indicated by the position information Po.

Note that the above-described backlight control for achieving the transition display property may be solely performed but may be used with the control for changing the electro-optic conversion property to the transition property.

As described above, in the transmission and reception system 10 illustrated in FIG. 1, the transmission apparatus 100 inserts, into the video stream obtained by encoding the image data, the pixel statistical information used to determine, when image switching takes place, whether to keep the display property switched, during the transition display period, to the transition display property with the brightness level kept lower than the normal level, and the transmission apparatus 100 transmits the resultant video stream. This enables the reception side to save time and effort to calculate the pixel statistical information used to determine, when image switching takes place, whether to keep the display property switched, during the transition display period, to the transition display property with the brightness level kept lower than the normal level.

Additionally, in the transmission and reception system 10 illustrated in FIG. 1, when the image is switched, the reception apparatus 200 keeps the display property switched, during the transition display period, to the transition display property with the brightness level kept lower than the normal level, on the basis of the pixel statistical information regarding the image. Thus, visual safety can be ensured when image switching takes place.

2. MODIFIED EXAMPLES

Note that the above-described embodiment illustrates an example of the transmission and reception system 10 including the transmission apparatus 100 and the reception apparatus 200 but that no such limitation is imposed on the configuration of the transmission and reception system to which the present technique is applicable. The portion of the reception apparatus 200 may include a set top box and a monitor (display) connected together by a digital interface (multimedia interface), for example, an HDMI (High-Definition Multimedia Interface). Note that "HDMI" is a registered trademark.

Figure 19:
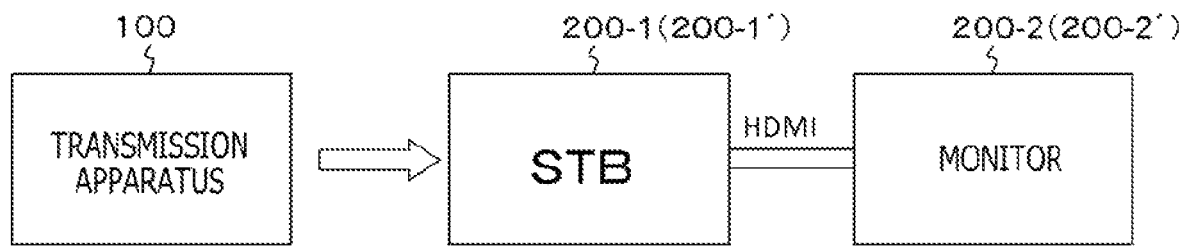
FIG. 19 is a block diagram illustrating another example of a configuration of the transmission and reception system.

FIG. 19 illustrates an example of a configuration of a transmission and reception system 10A. The transmission and reception system 10A includes the transmission apparatus 100, a set top box (STB) 200-1 (200-1'), and a monitor 200-2 (200-2'). The set top box (STB) 200-1 (200-1') and the monitor 200-2 (200-2') are connected together by the HDMI.

The transmission apparatus 100 is the same as the transmission apparatus 100 (see FIG. 9) in the transmission and reception system 10 illustrated in FIG. 1, and thus description of the transmission apparatus 100 is omitted. The set top box 200-1 receives, for example, a broadcasting stream (MPEG-2 TS, MMT, MP4 (ISOBMFF), or the like) transmitted through broadcasting or communication. The monitor 200-2 (200-2') displays HDR image data transmitted from the set top box (STB) 200-1 (200-1') by the HDMI.

Figure 20:
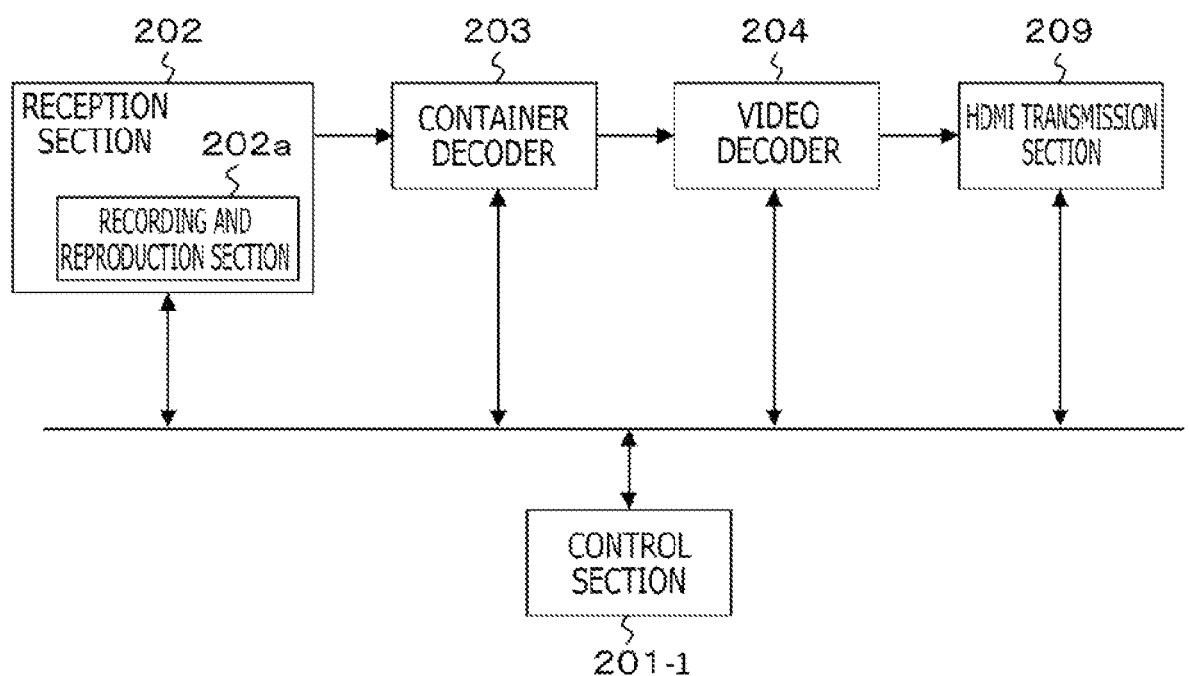
FIG. 20 is a block diagram illustrating an example of a configuration of a set top box.

FIG. 20 illustrates an example of a configuration of the set top box 200-1. Components in FIG. 20 for which corresponding components are illustrated in FIG. 14 and FIG. 18 are denoted by the same reference numerals. The set top box 200-1 includes a control section 201-1, the reception section 202, the container decoder 203, the video decoder 204, and an HDMI transmission section 209. The set top box 200-1 includes the portion of the reception apparatus 200A in FIG. 18 including the reception section 202, the container decoder 203, and the video decoder 204.

The control section 201-1 controls operation of each section of the set top box 200-1. The reception section 202, the container decoder 203, and the video decoder 204 are configured and operate similarly to the reception section 202, the container decoder 203, and the video decoder 204 in the reception apparatus 200A in FIG. 18, and description of these components is omitted.

The HDMI transmission section 209 transmits, to the monitor 200-2 via an HDMI transmission path through communication in compliance with HDMI, the HDR image data obtained by the video decoder 204, the pixel statistical information (information regarding the ratio α, to the entire image, of the pixels each with a pixel level exceeding the threshold level (TH_high)) acquired from the above-described statistical information SEI message (see FIG. 12(a)) and the information regarding the transition display period TTh, and the information regarding the electro-optic conversion transition property and acquired from the above-described transition transfer function SEI message (see FIG. 13(a)).

In this case, the information regarding the ratio α, used as the pixel statistical information, the information regarding the transition display period TTh, and the information regarding the electro-optic conversion transition property are inserted into a blanking period in the HDR image data for transmission. In this case, a Transitional Display Control HDMI Info Frame, which is newly defined, is used to transmit the information regarding the ratio α, used as the pixel statistical information, and the information regarding the transition display period TTh. Additionally, a Transition Transfer Function HDMI Info Frame, which is newly defined, is used to transmit the information regarding the electro-optic conversion transition property.

FIG. 21(a) illustrates an example of a structure (Syntax) of the transitional display control HDMI info frame, and FIG. 21(b) illustrates the contents (Semantics) of main information in the example of the structure. First three bytes in the info frame form a header portion in which pieces of information including an info frame type, a version number, and a byte length of data bytes are arranged.

4-bit information "EOTF Type" is located in from seventh to fourth bits of Data Byte 1. The 4-bit information indicates the type of the EOTF. For example, "1" denotes "ITU-R Rec. BT.709(gamma)," "2" denotes "ITU-R Rec. BT.2100 PQ," and "3" denotes "ITU-R Rec. BT.2100 HLG."

16-bit information "threshold_level" is located in Data Byte 2 and Data Byte 3. The 16-bit information indicates a lower limit threshold for pixel level values targeted for statistical information, in other words, the threshold level (TH_high).

8-bit information "high_level_target_ratio" is located in Data Byte 4. The 8-bit information indicates the ratio α, to the entire image, of the pixels targeted for the transition property. The ratio is multiplied by 100 to obtain a percent value. Furthermore, 16-bit information "transition_period" is located in Data Byte 5 and Data Byte 6. The 16-bit information indicates the transition display period TTh expressed in frame count value.

FIG. 22(a) illustrates an example of structure (Syntax) of a transition transfer function HDMI info frame, and FIG. 22(b) illustrates the contents (Semantics) of main information in the example of the structure. First three bytes of the info frame form a header portion in which pieces of information including an info frame type, a version number, and the byte length of data bytes are arranged.

8-bit information "number_of_transition_types" is located in the Data Byte 1. The 8-bit information indicates the number of types of the transition property. The information regarding the transition property is repeatedly present such that the number of repetitions is equal to the number of types of the transition property. 4-bit information "transitionTF Type" is located in from the seventh bit to the fourth bit of the Data Byte 2. The 4-bit information indicates the type of the transition property. For example, "1" denotes Type 1, "2" denotes Type 2, and "3" denotes Type 3 (see FIG. 3 and FIG. 4).

16-bit information "minimum_level" is located in the Data Byte 3 and the Data Byte 4. The 16-bit information indicates the minimum input pixel level of a curve at which the target EOTF is changed (see the threshold level H of the transmission code value in FIG. 3 and FIG. 4). 16-bit information "maximum_level" is located in Data Byte 5 and Data Byte 6. The 16-bit information indicates the maximum input pixel level of a curve at which the target EOTF is changed (see the maximum level M of the transmission code value in FIG. 3 and FIG. 4).

16-bit information "trace_pivot_size" is located in Data Byte 7 and Data Byte 8. The 16-bit information indicates the number of points through which the transition property is traced. The 16-bit information "input_level(j)" and the 16-bit information "output_level(j)" are repeatedly present such that the number of repetitions is equal to the number of points through which the transition property is traced. 16-bit information "input_level(j)" is located in Data Byte 9 and Data Byte 10. The 16-bit information indicates the input pixel level of the transition property. The 16-bit information "input_level(j)" is located in Data Byte 11 and Data Byte 12. The 16-bit information indicates an output value for the transition property corresponding to the input level.

Illustration of Data Byte 13 and subsequent bytes is omitted. The Data Byte 13 and subsequent bytes are repetitions of Data Byte 9 to Data Byte 12 dependent on "trace_pivot_size," and are also repetitions of Data Byte 2 to Data Byte 12 dependent on "number_of_transition_types."

Figure 23:
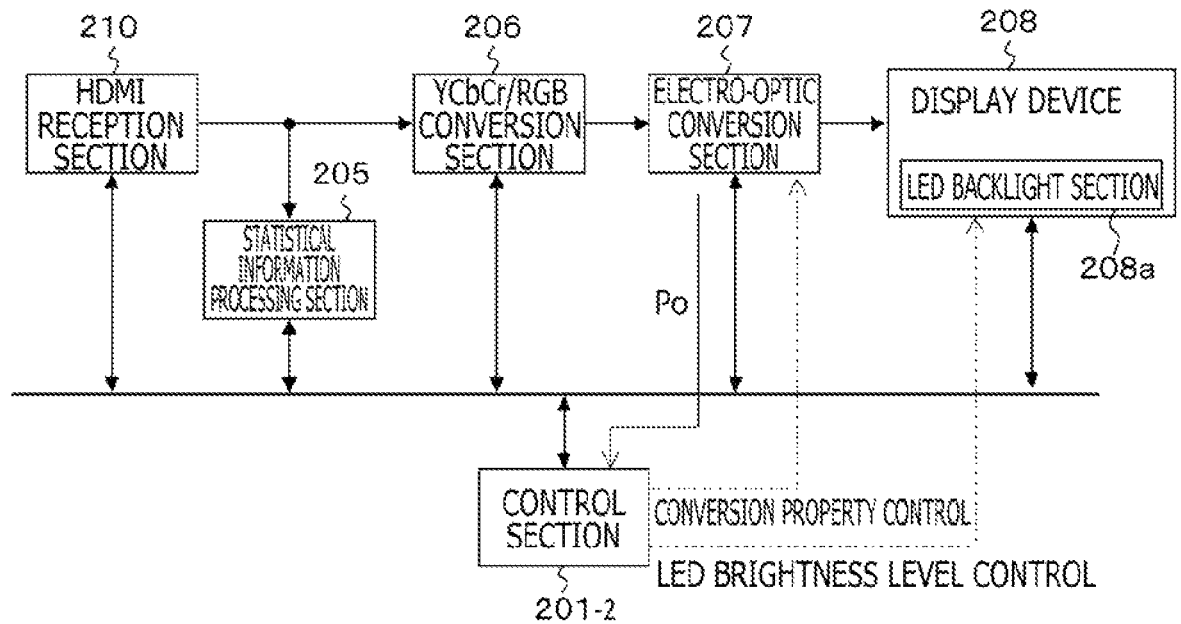
FIG. 23 is a block diagram illustrating an example of a configuration of a monitor.

FIG. 23 illustrates an example of a configuration of a monitor 200-2 connected to the set top box 200-1 in FIG. 20. Components in FIG. 23 for which corresponding components are illustrated in FIG. 14 and FIG. 18 are denoted by the same reference numerals. The monitor 200-2 includes a control section 201-2, an HDMI reception section 210, the statistical information processing section 205, the YCbCr/RGB conversion section 206, the electro-optic conversion section 207, and the display device 208.

The control section 201-2 controls operation of each section of the monitor 200-2. The HDMI reception section 210 receives the HDR image data, the pixel statistical information (information regarding the ratio α, to the entire image, of the pixels each with a pixel level exceeding the threshold level (TH_high)) and the information regarding the transition display period TTh, and the information regarding the electro-optic conversion transition property, from the set top box 200-1 via the HDMI transmission path through communication complying with HDMI. Each type of information is transmitted to the control section 201-2.

When the HDMI reception section 210 fails to receive the information regarding the ratio α, used as the pixel statistical information, and the information regarding the transition display period TTh, the statistical information processing section 205 processes the HDR image data received by the HDMI reception section 210 to calculate the information regarding the ratio α and the information regarding the transition display period TTh. The statistical information processing section 205 transmits the calculated ratio α and information regarding the transition display period TTh to the control section 20-2.

The YCbCr/RGB conversion section 206 converts the HDR image data obtained by the HDMI reception section 210 from the YCbCr (brightness and color difference) domain to the RGB domain. The electro-optic conversion section 207 applies the electro-optic conversion property to the image data in the RGB domain resulting from the conversion by the YCbCr/RGB conversion section 206, thus obtaining the display image data. The display device 208 is, for example, a liquid crystal display (LCD), and displays an image based on the display image data.

Under the control of the control section 201-2', the electro-optic conversion section 207 normally applies the normal HDR electro-optic conversion property (HDR EOTF), but in a case where image switching is performed by nonlinear reproduction, as in channel switching, system activation, random access, and CM/program switching, applies the transition property (TRTF) during the transition display period (TTh) after the switching to keep the brightness level of the displayed image lower than the normal level (see FIG. 2 and FIGS. 5 to 8).

Additionally, the electro-optic conversion section 207 obtains the position information Po regarding the pixels each having a pixel level exceeding the threshold level (TH_high) and targeted for the transition property, and transmits the position information Po to the control section 201-2. Then, the control section 201-2 controls the LED backlight section 208a of the display device 208 to reduce the light emission level of the LEDs corresponding to the pixels at the positions indicated by the position information Po such that the display property during the transition display period is changed to the transition display property with the brightness level kept lower than the normal level.

Note that the monitor 200-2 performs both control of the electro-optic conversion property to the transition property and control for suppressing the brightness level of the backlight to reduce the brightness level of the displayed image, thus ensuring visual safety during the transition display period, but one of the control operations may exclusively performed.

Figure 24:
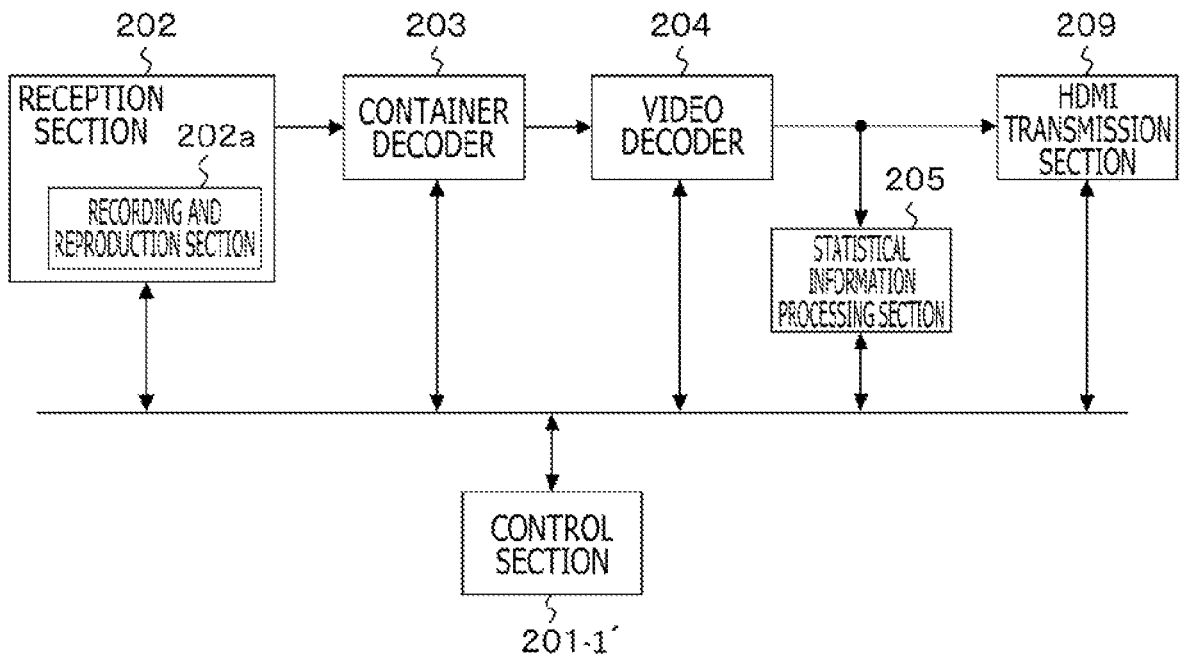
FIG. 24 is a block diagram illustrating another example of a configuration of the set top box.

FIG. 24 illustrates an example of a configuration of the set top box 200-1'. Components in FIG. 24 for which corresponding components are illustrated in FIG. 14, FIG. 18, and FIG. 20 are denoted by the same reference numerals. The set top box 200-1 includes the control section 201-1', the reception section 202, the container decoder 203, the video decoder 204, the statistical information processing section 205, and the HDMI transmission section 209. The set top box 200-1' includes the reception section 202, the container decoder 203, the video decoder 204, and the statistical information processing section 205 in the reception apparatus 200A in FIG. 18.

The control section 201-1' controls operation of each section of the set top box 200-1'. The reception section 202, the container decoder 203, the video decoder 204, and the statistical information processing section 205 are configured and operate similarly to the reception section 202, the container decoder 203, the video decoder 204, and the statistical information processing section 205 in the reception apparatus 200A in FIG. 18, and will thus not be described below.

The HDMI transmission section 209 transmits HDR image data obtained by the video decoder 204, the pixel statistical information (information regarding the ratio α, to the entire image, of the pixels each with a pixel level exceeding the threshold level (TH_high)) and the information regarding the transition display period TTh, and the information regarding the electro-optic conversion transition property, to the monitor 200-2' via the HDMI transmission path through communication complying with HDMI.

In this case, the information regarding the ratio α, used as the pixel statistical information, the information regarding the transition display period TTh, and the information regarding the electro-optic conversion transition property are inserted into a blanking period in the HDR image data, which is then transmitted. In this case, the transitional display control HDMI info frame (FIG. 21(a)), which is newly defined, is used to transmit the information regarding the ratio α, used as the pixel statistical information, and the information regarding the transition display period TTh. Additionally, the transition transfer function HDMI info frame (see FIG. 22(a)), which is newly defined, is used to transmit the information regarding the electro-optic conversion transition property.

Figure 25:
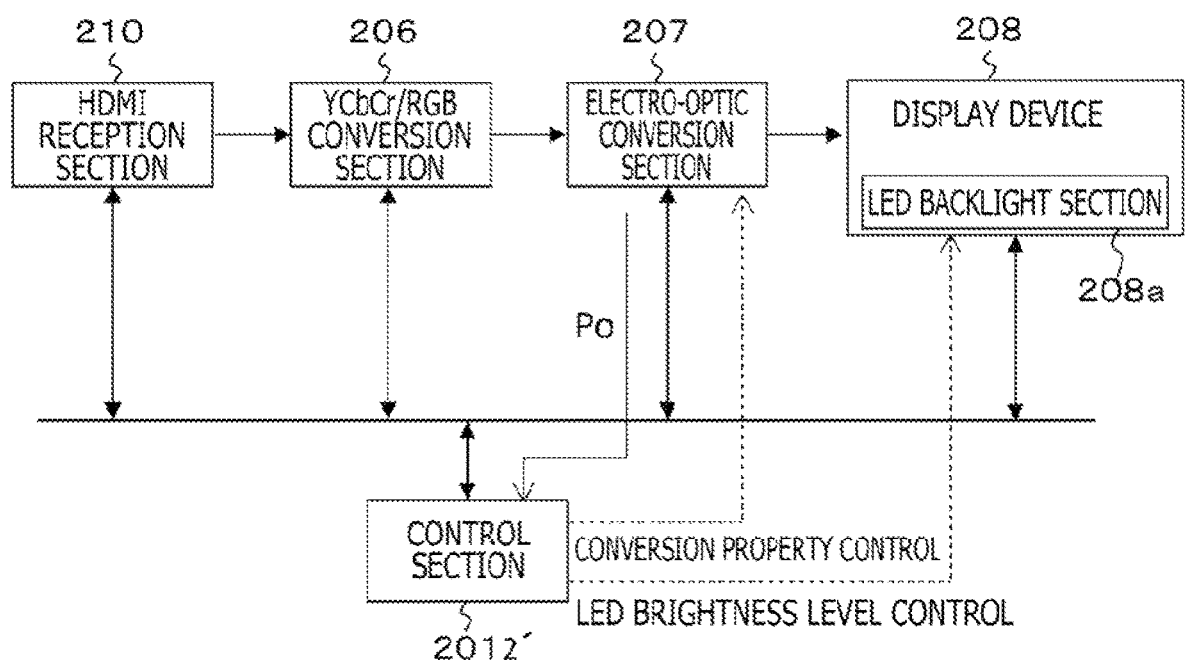
FIG. 25 is a block diagram illustrating another example of a configuration of the monitor.

FIG. 25 illustrates an example of a configuration of the monitor 200-2' connected to the set top box 200-1'. Components in FIG. 24 for which corresponding components are illustrated in FIG. 14, FIG. 18, and FIG. 23 are denoted by the same reference numerals. The monitor 200-2' includes the control section 201-2', the HDMI reception section 210, the YCbCr/RGB conversion section 206, the electro-optic conversion section 207, and the display device 208.

The control section 201-2' controls operation of each section of the monitor 200-2'. The HDMI reception section 210 receives the HDR image data, the pixel statistical information (information regarding the ratio α, to the entire image, of the pixels each with a pixel level exceeding the threshold level (TH_high)) and the information regarding the transition display period TTh, and the information regarding the electro-optic conversion transition property, from the set top box 200-1' via the HDMI transmission path through communication complying with HDMI. Each type of information is transmitted to the control section 201-2'.

The YCbCr/RGB conversion section 206 converts the HDR image data obtained by the HDMI reception section 210 from the YCbCr (brightness and color difference) domain to the RGB domain. The electro-optic conversion section 207 applies the electro-optic conversion property to the image data in the RGB domain resulting from the conversion by the YCbCr/RGB conversion section 206, thus obtaining the display image data. The display device 208 is, for example, a liquid crystal display (LCD), and displays an image based on the display image data.

Under the control of the control section 201-2, the electro-optic conversion section 207 normally applies the normal HDR electro-optic conversion property (HDR EOTF), but in a case where image switching is performed by nonlinear reproduction, as in channel switching, system activation, random access, and CM/program switching, applies the transition property (TRTF) during the transition display period (TTh) after the switching to keep the brightness level of the displayed image lower than the normal level (see FIG. 2 and FIGS. 5 to 8).

Additionally, the electro-optic conversion section 207 obtains the position information Po regarding the pixels each having a pixel level exceeding the threshold level (TH_high) and targeted for the transition property, and transmits the position information Po to the control section 201-2'. Then, the control section 201-2 controls the LED backlight section 208a of the display device 208 to reduce the light emission level of the LEDs corresponding to the pixels at the positions indicated by the position information Po such that the display property during the transition display period is changed to the transition display property with the brightness level kept lower than the normal level.

Note that the monitor 200-2' performs both control of the electro-optic conversion property to the transition property and control for suppressing the brightness level of the backlight to reduce the brightness level of the displayed image, thus ensuring visual safety during the transition display period, but one of the control operations may exclusively performed.

Additionally, the present technique can be configured as follows.

(1) An image processing apparatus including:
a control section keeping, when an image is switched, a display property switched, during a transition display period, to a transition display property with a brightness level kept lower than a normal level, on the basis of pixel statistical information regarding the image.

(2) The information processing apparatus according to (1) described above, in which
the pixel statistical information includes information indicating a ratio, to an entire image, of pixels exceeding a threshold level.

(3) The information processing apparatus according to (1) or (2) described above, in which
the control section utilizes the pixel statistical information obtained by processing image data.

(4) The information processing apparatus according to any one of (1) to (3) described above, in which
the control section utilizes information regarding the transition display period obtained on the basis of the pixel statistical information.

(5) The information processing apparatus according to (1) or (2) described above, in which
the control section utilizes the pixel statistical information or the information regarding the transition display period extracted from encoded image data.

(6) The information processing apparatus according to any one of (1) to (5) described above, in which
as the transition display property, a plurality of levels of transition display properties is present, and
the control section sequentially applies the plurality of levels of transition display properties during the transition display period.

(7) The information processing apparatus according to any one of (1) to (6) described above, in which
the control section keeps an electro-optic conversion property applied to image data, to a transition property during the transition display period.

(8) The information processing apparatus according to any one of (1) to (7) described above, in which
the control section keeps the brightness level of a backlight of a display device lower than the normal level during the transition display period.

(9) An image processing method including:
keeping, by a control section, when an image is switched, a display property switched, during a transition display period, to a transition display property with a brightness level kept lower than a normal level, on the basis of pixel statistical information regarding the image.

(10) A transmission apparatus including:
a transmission section transmitting a video stream obtained by encoding image data, and
an information insertion section inserting, into the video stream, pixel statistical information used to determine, when an image is switched, whether to keep a display property switched, during a transition display period, to a transition display property with a brightness level kept lower than a normal level.

(11) The transmission apparatus according to (10) described above, in which
the pixel statistical information includes information indicating a ratio, to an entire image, of pixels exceeding a threshold level.

(12) The transmission apparatus according to (10) or (11) described above, in which
the information insertion section further inserts information regarding the transition display period into the video stream.

(13) The transmission apparatus according to any one of (10) to (12) described above, in which
   the information insertion section further inserts, into the video stream, an electro-optic conversion transition property applied to the image data during the transition display period.

(14) The transmission apparatus according to (13) described above, in which
   the information regarding the electro-optic conversion transition property includes table information corresponding to a range of change in a normal electro-optic conversion property.

(15) The transmission apparatus according to (13) or (14) described above, in which
   as the transition property, a plurality of levels of transition properties is present.

(16) A transmission method including:
   transmitting, by a transmission section, a video stream obtained by encoding image data, and
   inserting, by an information insertion section, into the video stream, pixel statistical information used to determine, when an image is switched, whether to keep a display property switched, during a transition display period, to a transition display property with a brightness level kept lower than a normal level.

(17) A transmission apparatus including:
   a digital interface section transmitting, along with image data, pixel statistical information used to determine, when an image is switched, whether to keep a display property switched, during a transition display period, to a transition display property with a brightness level kept lower than a normal level.

(18) The transmission apparatus according to (17) described above, in which
   the digital interface section further transmits information regarding an electro-optic conversion transition property applied to the image data during the transition display period.

(19) The transmission apparatus according to (18) described above, in which
   the information regarding the electro-optic conversion transition property includes table information corresponding to a range of change in a normal electro-optic conversion property.

(20) A reception apparatus including:
   a digital interface section receiving, along with image data, pixel statistical information used to determine, when an image is switched, whether to keep a display property switched, during a transition display period, to a transition display property with a brightness level kept lower than a normal level.

A main feature of the present technique is that by keeping, when an image is switched by nonlinear reproduction, the display property switched, during the transition display period, to the transition display property with the brightness level kept lower than the normal level, visual safety can be ensured when the image is switched (see FIG. 2, FIG. 3, FIG. 14, and FIG. 15).

REFERENCE SIGNS LIST 10, 10A . . . Transmission and reception system
100 . . . Transmission apparatus
101 . . . Control section
102 . . . Photoelectric conversion section
103 . . . RGB/YCbCr conversion section
104 . . . Statistical information processing section
105 . . . Video encoder
106 . . . Container encoder
107 . . . Transmission section
200, 200A . . . Reception apparatus
200-1, 200-1' . . . Set top box
200-2, 200-2' . . . Monitor
201, 201-1, 201-1', 201-2, 201-2' . . . Control section
202 . . . Reception section
202a . . . Recording and reproduction section
203 . . . Container decoder
204 . . . Video decoder
205 . . . Statistical information processing section
206 . . . YCbCr/RGB conversion section
207 . . . Electro-optic conversion section
208 . . . Display device
208a . . . LED backlight section
209 . . . HDMI transmission section
210 . . . HDMI reception section

The invention claimed is:

1. A reception apparatus comprising:
   circuitry configured to:
   receive groups of pictures from a video stream;
   decode the groups of pictures to obtain image data of the groups of pictures; and
   apply a transition display property on first frames of the image data during a transition display period after a time of switching from a previous frame to a current frame in the video stream, the previous frame and the current frame are not sequential frames in the video stream, the switching is a channel switching,
   wherein the first frames of the image data within the transition display period are caused via the application of the transition display property to have a lower brightness than a brightness of second frames of the image data after the transition display period, and
   wherein the circuitry is configured to apply a normal display property, specified according to control information included in the video stream, on the second frames for
   display, the transition display property is transitioned to the normal display property immediately after the transition display period.

2. The reception apparatus according to claim 1, comprising a display including a backlight, wherein the circuitry is configured to hold a brightness level of the backlight of the display lower than a normal level during the transition display period.

3. The reception apparatus according to claim 1, wherein the control information is included in a video usability information (VUI) region of the video stream.

4. The reception apparatus according to claim 1, wherein the circuitry is configured to apply the transition display property based on pixel statistical information included in the video stream.

5. The reception apparatus according to claim 1, wherein the circuitry configured to determine the transition display period based on pixel statistical information included in the video stream.

6. The reception apparatus according to claim 1, wherein the circuitry is further configured to receive metadata in the video stream that includes information indicating the transition display property or the transition display period.

7. The reception apparatus according to claim 6, wherein the information indicating the transition display property or the transition display period is included in a supplemental enhancement information (SEI) message of the video stream.

8. The reception apparatus according to claim 6, wherein the information indicating the transition display property or the transition display period is included in an Info Frame.

9. The reception apparatus according to claim 6, wherein the information indicating the transition display property is included in a media presentation description (MPD).

10. The reception apparatus according to claim 1, wherein substantially black or gray frames are provided after the time of switching.

11. A reception method comprising:
receiving groups of pictures from a video stream;
decoding the groups of pictures to obtain image data of the groups of pictures;
applying a transition display property on first frames of the image data during a transition display period after a time of switching from a previous frame to a current frame in the video stream, the previous frame and the current frame are not sequential frames in the video stream, the switching is a channel switching; and
applying a normal display property, specified according to control information included in the video stream, on second frames for display, the transition display property is transitioned to the normal display property immediately after the transition display period, wherein the first frames of the image data within the transition display period are caused via the application of the transition display property to have a lower brightness than a brightness of the second frames of the image data after the transition display period.

12. The reception method according to claim 11, wherein the control information is included in a video usability information (VUI) region of the video stream.

13. The reception method according to claim 11, comprising:
applying the transition display property based on pixel statistical information included in the video stream.

14. The reception method according to claim 11, comprising:
determining the transition display period based on pixel statistical information included in the video stream.

15. The reception method according to claim 11, comprising:
receiving metadata in the video stream that includes information indicating the transition display property or the transition display period.

16. The reception method according to claim 15, wherein the information indicating the transition display property or the transition display period is included in a supplemental enhancement information (SEI) message of the video stream.

17. The reception method according to claim 15 wherein the information indicating the transition display property or the transition display period is included in an Info Frame.

18. The reception method according to claim 15, wherein the information indicating the transition display property is included in a media presentation description (MPD).

19. A reception apparatus comprising:
circuitry configured to:
receive groups of pictures from a video stream;
decode the groups of pictures to obtain image data of the groups of pictures; and
process the image data to determine a transition display period after a time of switching between a first and second groups of the groups of pictures and determines pixel statistical information, the switching is a channel switching,
wherein responsive to the pixel statistical information, first frames within the transition display period have a lower brightness than a brightness of second frames in the second group,
wherein the first frames and the second frames are not sequential frames in the video stream, and
wherein a normal display property is applied, specified according to control information included in the video stream, on the second frames for display, the transition display property is transitioned to the normal display property immediately after the transition display period.

20. The reception apparatus according to claim 19, wherein substantially black or gray frames are provided after the time of switching.

* * * * *